United States Patent
Boven et al.

(10) Patent No.: US 7,521,119 B2
(45) Date of Patent: Apr. 21, 2009

(54) WINDOWS AND OTHER ARTICLES MADE FROM DMBPC POLYCARBONATE HOMOPOLYMER AND COPOLYMER

(75) Inventors: Geert Boven, Steenbergen (NL); Dennis Karlik, Bergen op Zoom (NL); Edward Kung, Bergen op Zoom (NL); Jan Pleun Lens, Breda (NL)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 251 days.

(21) Appl. No.: 11/177,134

(22) Filed: Jul. 7, 2005

(65) Prior Publication Data

US 2007/0009741 A1 Jan. 11, 2007

(51) Int. Cl.
*B32B 27/36* (2006.01)
*B32B 9/04* (2006.01)

(52) U.S. Cl. .......................... 428/412; 40/700; 40/706; 40/714; 40/716; 40/781; 296/145; 428/411.1; 528/196; 528/198

(58) Field of Classification Search .................. 40/700, 40/706, 714, 716, 781; 296/145; 428/411.1, 428/412; 528/196, 198
See application file for complete search history.

(56) References Cited

U.S. PATENT DOCUMENTS

| | | | | |
|---|---|---|---|---|
| 3,356,833 A | * | 12/1967 | Orcutt | 219/522 |
| 3,410,739 A | * | 11/1968 | Orcutt | 156/106 |
| 3,424,642 A | * | 1/1969 | Orcutt | 428/38 |
| 3,441,924 A | * | 4/1969 | Peek et al. | 340/550 |
| 3,528,722 A | * | 9/1970 | Makas | 359/498 |
| 3,734,698 A | * | 5/1973 | Postupack | 428/552 |
| 3,900,655 A | * | 8/1975 | Wolgemuth et al. | 428/214 |
| 4,045,269 A | | 8/1977 | Voss et al. | |
| 4,304,899 A | * | 12/1981 | Mark et al. | 528/171 |
| 4,592,629 A | * | 6/1986 | Giacomelli | 351/41 |
| 4,727,134 A | | 2/1988 | Brunelle et al. | |
| 4,930,163 A | * | 6/1990 | King | 2/444 |
| 5,010,162 A | | 4/1991 | Serini et al. | |
| 5,010,163 A | | 4/1991 | Serini et al. | |
| 5,021,542 A | | 6/1991 | Serini et al. | |
| 5,034,458 A | | 7/1991 | Serini et al. | |
| 5,051,490 A | * | 9/1991 | Joyce et al. | 528/190 |
| 6,001,953 A | | 12/1999 | Davis et al. | |
| 6,060,577 A | * | 5/2000 | Davis | 528/196 |
| 6,255,438 B1 | * | 7/2001 | Whitney et al. | 528/196 |
| 6,395,364 B1 | | 5/2002 | Davis et al. | |
| 6,441,123 B1 | * | 8/2002 | Hariharan et al. | 528/196 |
| 6,465,102 B1 | * | 10/2002 | Honigfort et al. | 428/412 |
| 6,482,488 B1 | * | 11/2002 | Janssen et al. | 428/40.1 |
| 6,518,391 B1 | | 2/2003 | McCloskey et al. | |
| 6,537,636 B1 | | 3/2003 | Wisnudel et al. | |
| 6,552,158 B1 | * | 4/2003 | Srinivasan et al. | 528/196 |
| 6,593,425 B2 | | 7/2003 | Hariharan et al. | |
| 6,844,071 B1 | | 1/2005 | Wang et al. | |
| 7,138,479 B2 | * | 11/2006 | Dhara et al. | 528/196 |
| 2003/0060575 A1 | | 3/2003 | Caruso et al. | |
| 2004/0043254 A1 | | 3/2004 | Wisnudel et al. | |
| 2004/0188124 A1 | * | 9/2004 | Stark | 174/52.3 |

FOREIGN PATENT DOCUMENTS

| | | |
|---|---|---|
| EP | 0 387 596 | 9/1990 |
| EP | 0 413 190 | 2/1991 |
| EP | 1 287 073 | 6/2004 |
| JP | 2002-014480 | 1/2002 |
| JP | 2002-040679 | 2/2002 |
| WO | WO 80/00348 | 3/1980 |
| WO | WO 03/093382 | 11/2003 |
| WO | WO 2004/023469 | 3/2004 |

OTHER PUBLICATIONS

"Effect of chemical structure on the behavior of polycarbonate films". Perepelkin, A. N.; Kozlov, P. V. Vysokomolekulyamye Soedineniya, Seriya A, 10(1), 15-21 (Russian)1968. CODEN: VYSAAF. ISSN: 0507-5475.*
DUO-Gard: Polycarboante Technology Architectural Daylighting Systems and Site-Shelter Solutions: Polycarbonate technology, Company founded in 1984: http://www.duo-gard.com/polycarb.html.*

* cited by examiner

*Primary Examiner*—Terressa M Boykin
(74) *Attorney, Agent, or Firm*—Larson & Anderson, LLC

(57) ABSTRACT

Windows and other articles made from dimethyl bisphenol cyclohexane (DMBPC) polycarbonate exhibit enhanced scratch resistance properties and Mw degradation resistance properties as compared to traditional polycarbonates. Such windows and other articles made from DMBPC polycarbonate can be used in various applications including buildings, particularly in agricultural environments and in electronic devices.

67 Claims, 17 Drawing Sheets

WINDOWS AND OTHER ARTICLES MADE FROM DMBPC POLYCARBONATE HOMOPOLYMER AND COPOLYMER

BACKGROUND OF THE INVENTION

Polycarbonate is known as being an excellent molding material since products made therefrom exhibit such properties as high impact strength, toughness, high transparency, wide temperature limits for thermal endurance, good dimensional stability, good creep resistance, and the like.

However, traditional types of polycarbonates have been known to degrade when exposed to environments containing ammonia or other basic substances. Further polycarbonates have been found to scratch easily when exposed to abrasive materials such as steel wool or other cleaning tools. Thus it would be beneficial to produce a polycarbonate that can withstand exposure to a basic environment and resist scratches.

SUMMARY OF THE INVENTION

The present invention provides polycarbonate articles that exhibit reduced polymer degradation when exposed basic environments such as an ammonia-rich atmosphere. Further the articles of the present invention have been found to be more resistant to scratches and abrasion than traditional types of polycarbonate. It has herein been found that polymerizing or copolymerizing a monomer of structure I:

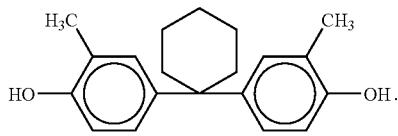

into polycarbonate results in superior properties including scratch and abrasion resistance as well as reduced degradation when the polycarbonate is exposed to a basic environment such as an ammonia environment.

In one embodiment of the present invention a window is provided wherein the window comprises: a frame, and a first sheet supported by the frame, wherein the first sheet comprises a first layer, wherein the first layer comprises polycarbonate comprising repeat units derived from a monomer of structure I.

DETAILED DESCRIPTION OF THE INVENTION

Figure 1:
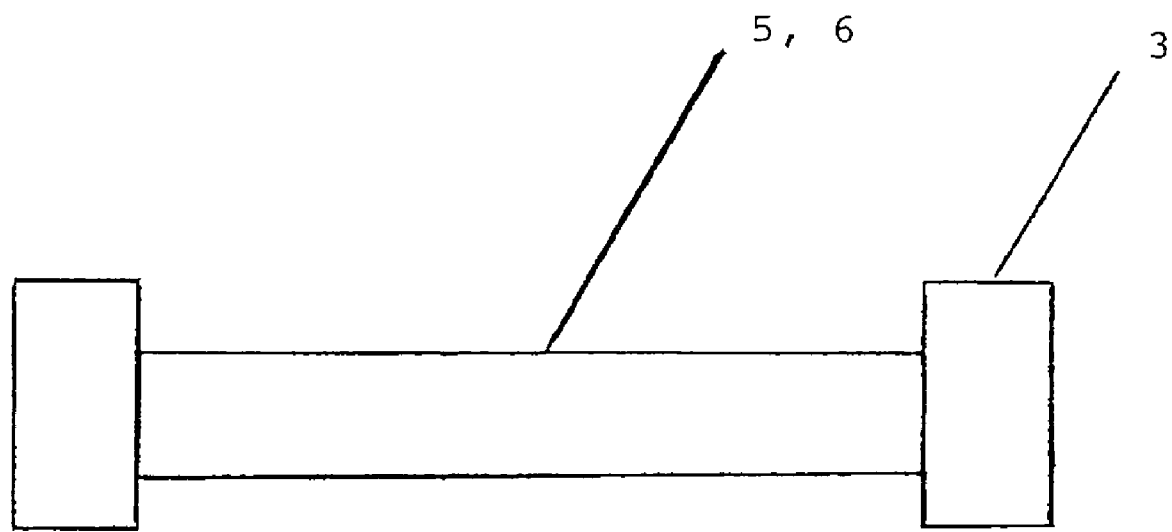
FIG. 1 shows a window in accordance with the present invention.

In accordance with the present invention, dimethyl bisphenol cyclohexane (DMBPC):

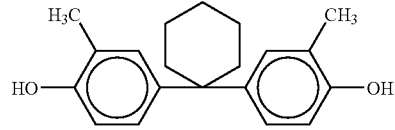

when used as a monomer in the production of polycarbonate has been found to provide superior properties to the polycarbonate compared to traditional BPA polycarbonate and other types of polycarbonates. These properties include increased scratch resistance and superior resistance to molecular weight degradation when the polymer is exposed to a basic environment such as an ammonia environment. In an embodiment of the present invention a window is provided comprising: a frame, and a first sheet supported by the frame, wherein the first sheet comprises a first layer, and wherein the first layer comprises polycarbonate comprising repeat units derived from a monomer of structure I:

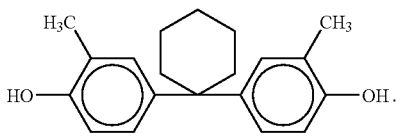

Applications of the DMBPC polycarbonate of the present invention include and are not limited to its use in basic environments and environments where exposure to abrasive forces are common. In particular the DMBPC polycarbonate of the present invention has a strong resistance to the polymer degradation forces of Ammonia. Ammonia serves as a useful cleaning agent in all types of industries and within the home. For example, ammonia or a diluted ammonia solution is commonly used as a household and industrial cleaner. Further, high concentrations of ammonia can be found in agricultural environments such as in the livestock stables and especially in pig stables. When exposed to an environment having a basic agent such as ammonia, polycarbonate degrades, changing a once transparent article into a hazy non-transparent and degraded one; It has herein been found that DMBPC when used as a monomer in a polycarbonate article provides superior resistance to the degradation forces of ammonia. Also, it has been found that the use of DMBPC as a monomer provides a sheet or article of polycarbonate with superior scratch and abrasion resistance as compared to traditional BPA polycarbonate sheets or articles. In another embodiment a window made from a traditional BPA polycarbonate substrate having a top layer of DMBPC polycarbonate has excellent ammonia resistance and is scratch resistant.

In the specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

"Polycarbonate", unless described otherwise, refers to polycarbonates incorporating repeat units derived from at least one dihydroxy aromatic compound and includes copolyestercarbonates, for example a polycarbonate comprising repeat units derived from resorcinol, bisphenol A, and dodecandioic acid. Nothing in the description and claims of this application should be taken as limiting the polycarbonate to only one kind of dihydroxy residue unless the context is expressly limiting. Thus, the application encompasses copolycarbonates with residues of 2, 3, 4, or more types of different dihydroxy compounds.

"Repeat unit(s)" means the block units or dihydroxy residues that are contained within the polymer chain of the polycarbonate and are derived from the starting dihydroxy compositions described below.

The windows, sheets, and other articles of the present invention may be transparent, translucent, or opaque depending on the application. For example, it may be desirable to have a translucent sheet in showers and light fixtures, while sheets in which portions of, or the entire sheet is opaque, may be helpful in applications such as in roofing materials or in areas of public transportation where scratch resistance and the ability to use strong cleaners is desirable. The windows, sheets, and other articles may also include combinations of transparent, translucent, and opaque regions.

"Transparent" is understood to mean in one embodiment that the sheet or article has light transmission of 50%, preferably 70%, and most preferably greater than 80% and a haze of less than 7, preferably less than 5, more preferably less than 2. Further, the term "transparent" does not require that all of the sheet or article is transparent and portions of the sheet or article may be opaque or translucent, for example to form a decorative pattern. All light transmission and haze values referred to herein are measured by ASTM D1003 at a thickness of 4.0 millimeters.

"Translucent" is herein defined as having a light transmission of about 25 to about 95% and haze less than 104% and greater than 7%.

"Coating" is a substance placed on the inner and/or outer surfaces of the sheet or an article of the present invention. Typical coatings are anti-static coatings, UV protection coating, Easy Clean (R) coatings, anti-microbial coatings, infra red shielding coatings, and hard coats. Typical hard coats can be silicone hard coats, acrylate hard coats (UV or thermally curable), silicone hard coats with acrylate primers, polyurethane hard coats, and melamine hard coats. Silicone hard coats are often preferred.

"Coplanar" as used in the present invention is not meant to indicate that the windows, sheets, or articles of present invention are necessarily flat or defined solely in single plane. The term as used herein means that the identified "coplanar" layer has the same relative shape as the underlying or overlying layer that it is referenced to. For example, the sheets and articles of the present invention may be curved. Notwithstanding this definition it is an embodiment of the present invention that some of the windows, sheets, and other articles described herein are flat.

FIGS. 1-10 are not drawn to scale and are only meant to be illustrative of the invention.

FIG. 1 depicts an embodiment of the present invention providing a window 1 having: a frame 3, and a first sheet 5 in the form of a first layer 6 supported by the frame 3, wherein the first layer 6 comprises polycarbonate comprising repeat units derived from a monomer of structure I:

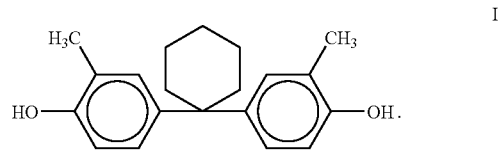

The first sheet 5/layer 6 is formed from a polycarbonate comprising the DMBPC monomer of the present invention. This sheet is supported by a frame 3. The frame 3 of the present invention is not particularly limited as it can be any structure of any material that supports the first sheet 5. The frame 3 may support the first sheet 5 at an edge thereof and is not necessarily limited to enclosing all edges of the first sheet 5. Further, frame 3 may support the first sheet 5 at a position located, not an edge but, within the first sheet 5.

Figure 10:
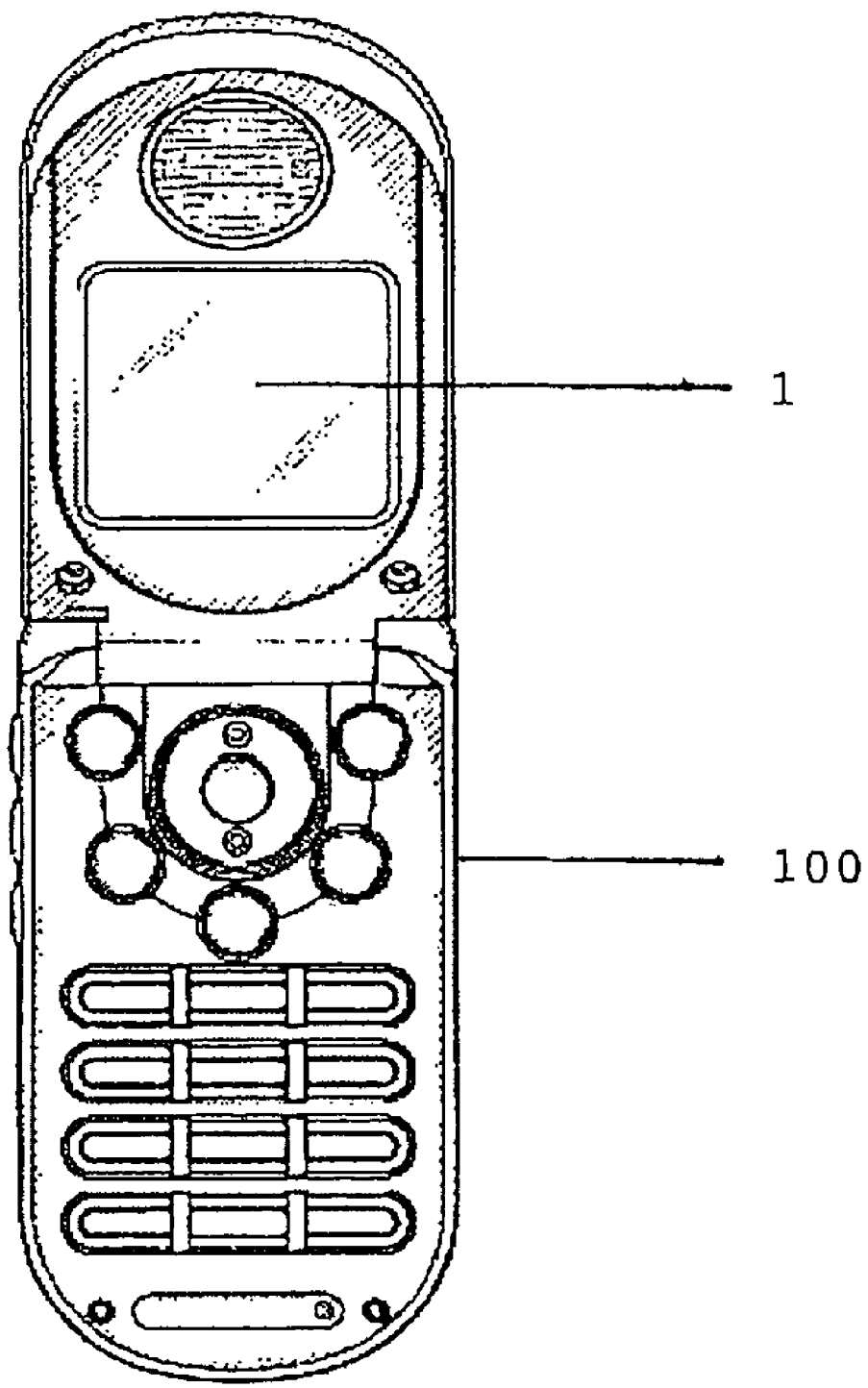
FIG. 10 shows a cell phone housing having a window of the present invention.

It is often preferred that the first sheet 5 is transparent in window applications. The window 1 may for example be a window 1 of a cell phone 100 as depicted in FIG. 10, a video display window, a vehicle window, a sliding glass door, an awning type window, a single hung window, a rolling window, a french door, a double hung window, or a window in a sound wall such as that found near highways. In these examples a frame 3 would be disposed, inter alia, in or integral with the housing of a cell phone or other electronic device, the body of a car, or within or on the outside of a building. In other applications it is preferred that the first sheet be translucent wherein light passes through the first sheet while objects located on the opposite side of the first sheet are not clearly discernable.

Figure 2:
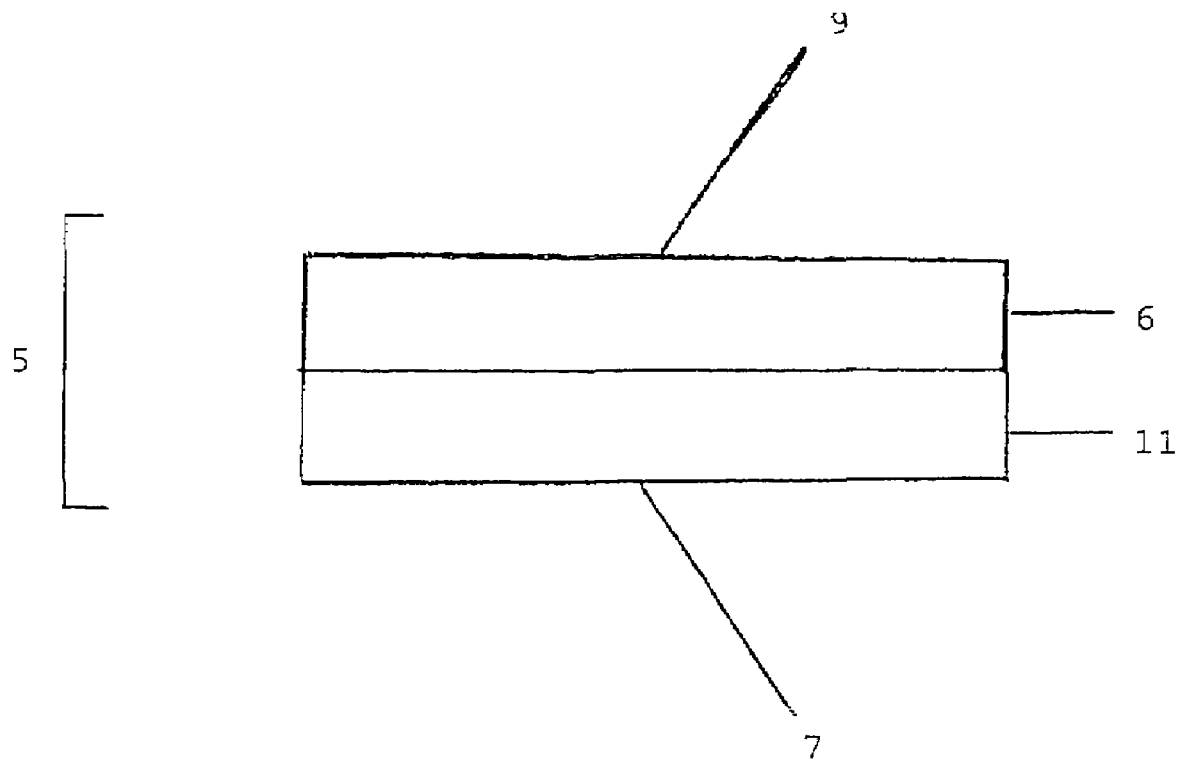
FIG. 2 shows an embodiment of the first sheet of the window of the present invention.

FIG. 2 depicts an embodiment of the present invention wherein the first sheet 5 has an inner side 7 and an outer side 9 wherein the first sheet 5 further comprises a coplanar substrate 11 wherein the substrate 11 is on the inner side 7 and the first layer 6 is on the outer side 9. It is often preferred that the substrate 11 comprise polycarbonate wherein the polycarbonate may or may not include repeat units derived from a monomer of structure I.

Figure 3:
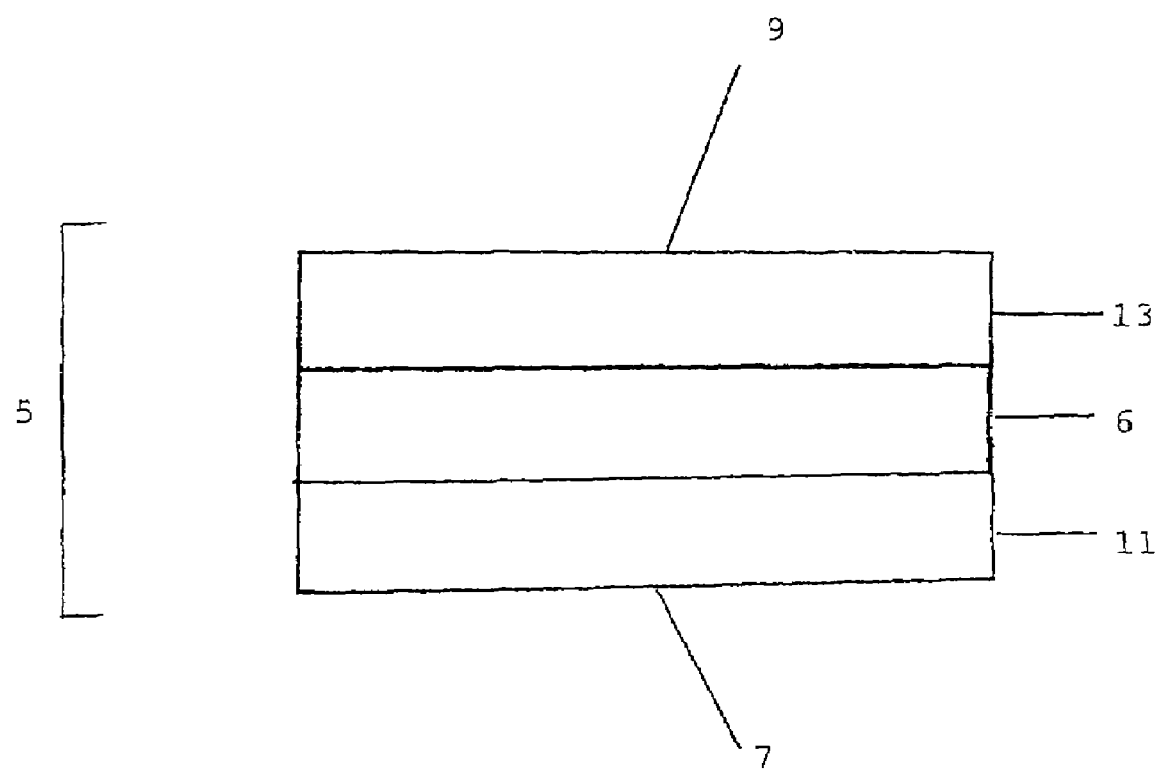
FIG. 3 shows an embodiment of the first sheet of the window of the present invention.

FIG. 3 depicts another embodiment of the first sheet 5 wherein the first sheet 5 further comprises a coplanar second layer 13 either in combination with or without the substrate 11, wherein the second layer 13 is disposed over the first layer 6 on the outer side 9 of the first sheet 5. It is often preferred that such second layer 13 be a coating layer as described above.

Figure 4:
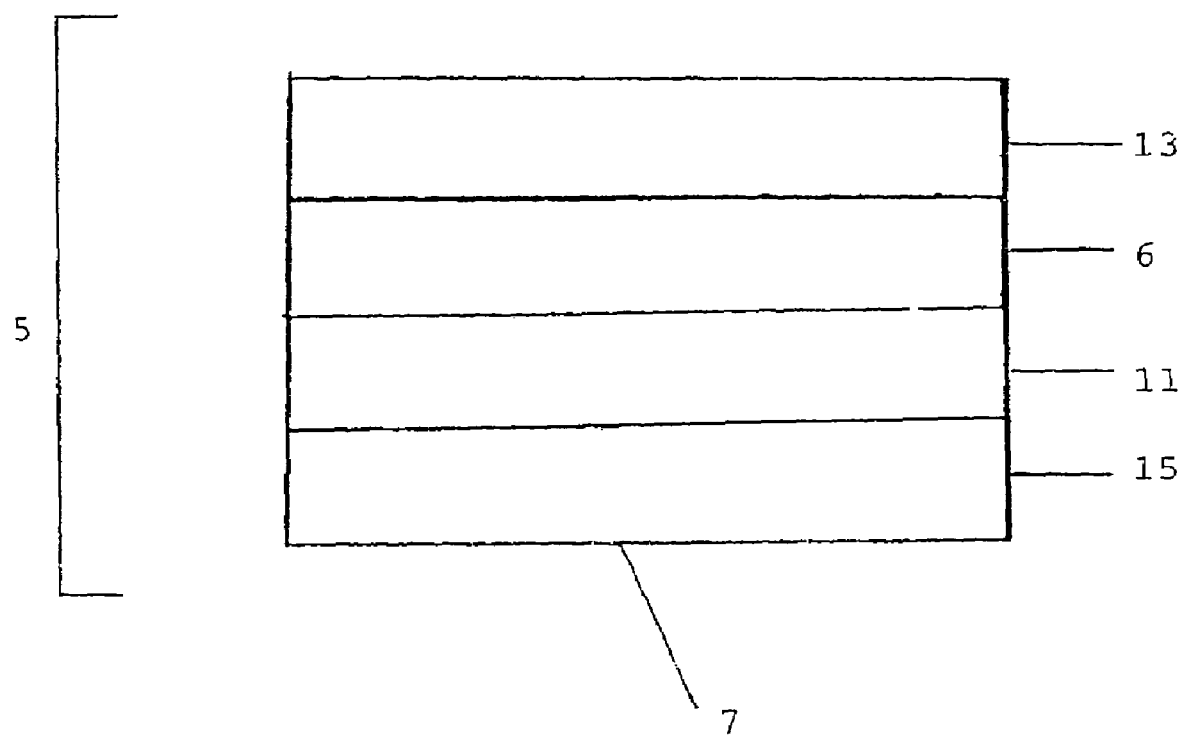
FIG. 4 shows an embodiment of the first sheet of the window of the present invention.

FIG. 4 depicts another embodiment of the first sheet 5 where the first sheet 5 further comprises a coplanar third layer 15 wherein the third layer 15 is disposed on the substrate 11 on the inner side 7 of the first sheet 5 wherein the third layer 15 comprises polycarbonate, wherein the polycarbonate of the third layer 15 comprises repeat units derived from the DMBPC monomer of structure I.

Figure 5:
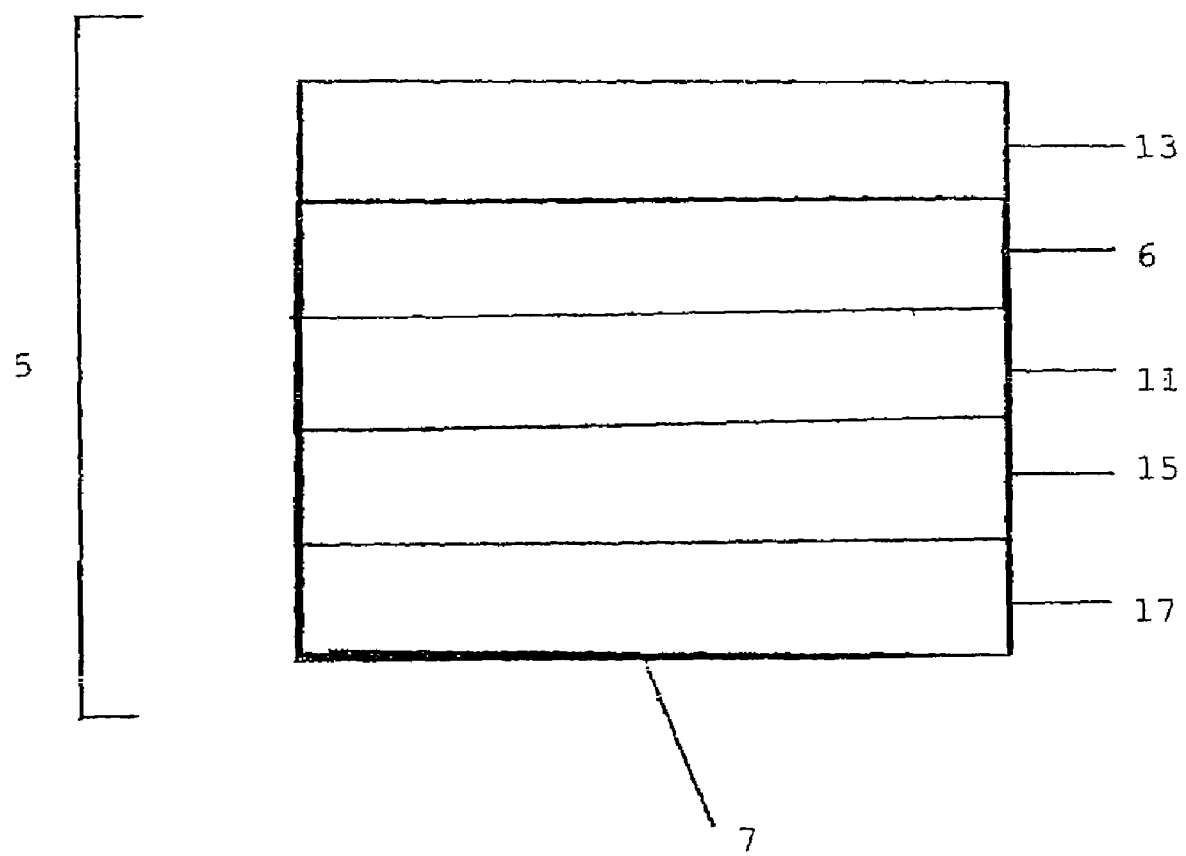
FIG. 5 shows an embodiment of the first sheet of the window of the present invention.

FIG. 5 depicts another embodiment of the first sheet 5 wherein the first sheet 5 further comprises a fourth layer 17, wherein the fourth layer 17 is disposed over the third layer 15 on the inner side 7 of the first sheet 5. It is often preferred that such fourth layer 17 be a coating, for example a hard coat layer as described above.

Figure 6:
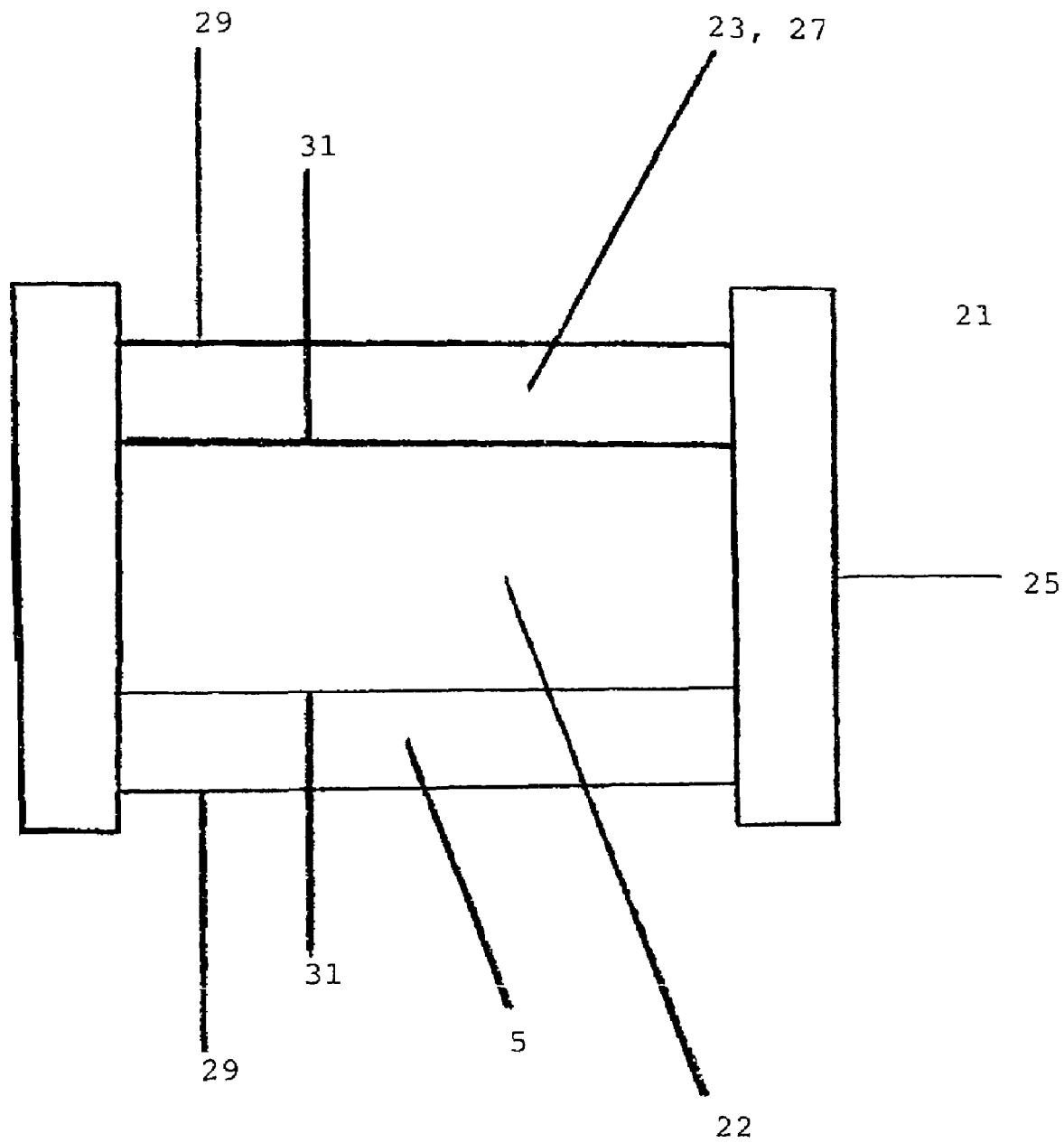
FIG. 6 shows a double pane window embodiment of the present invention.

FIG. 6 depicts yet another embodiment of the present invention wherein a double pane window 21 is provided wherein the window embodiments described above further comprise a second sheet 23 supported by a frame 25. In one embodiment the second sheet 23 comprises a first layer 27 of polycarbonate, wherein the first layer 27 of polycarbonate of the second sheet 23 comprises repeat units derived from the DMBPC monomer of structure I and wherein the first 5 and second 23 sheets have inner 31 and outer 29 sides wherein the inner side 31 of the first sheet 5 faces the inner side 31 of the second sheet 23. A sealed gap 22 exists between the panes (sheets) 5, 23 which can be a vacuum or filled with an inert gas such as argon as is conventional in multiple-pane windows. The panes 5, 23 either separately or in combination may have any of the configurations described above or shown in FIGS. 1 to 5. For example either the first, second, or both the first and the second sheets (panes) may be transparent. Windows with additional panes, for example triple pane windows, can also be used and are within the scope of the invention.

The method of making the DMBPC polycarbonate of the sheets and articles of the present invention is not particularly limited. It may be produced by any known method of producing polycarbonate including the well-known interfacial process using phosgene and/or the melt process using a diaryl carbonate, such as diphenyl carbonate or bismethyl salicyl carbonate, as the carbonate source. In the case in which an additional monomer, such as bisphenol A (BPA), is incorporated into the polycarbonate along with DMBPC to form a copolymer it is often preferred that the melt process is used to promote a more random dispersion of the monomers into the polymer chain.

As mentioned above, it is possible to incorporate another monomer into the polymer chain to make a copolymer comprising monomer units other than those derived from structure I. Other monomers are not limited and are suitably derived from a dihydroxy composition other than that of structure I.

Additional monomer units may be derived from dihydroxy compounds comprising aliphatic diols and/or acids. The following is a non-limiting list of such compounds:

Aliphatic Diols:

Isosorbide: 1,4:3,6-dianhydro-D-sorbitol, Tricyclodecane-dimethanol (TCDDM), 4,8-Bis(hydroxymethyl)tricyclodecane, Tetramethylcyclobutanediol (TMCBD), 2,2,4,4,-tetramethylcyclobutane-1,3-diol, mixed isomers, cis/trans-1,4-Cyclohexanedimethanol (CHDM), cis/trans-1,4-Bis(hydroxymethyl)cyclohexane, cyclohex-1,4-ylenedimethanol, trans-1,4-Cyclohexanedimethanol (tCHDM), trans-1,4-Bis(hydroxymethyl)cyclohexane, cis-1,4-Cyclohexanedimethanol (cCHDM), cis-1,4-Bis(hydroxymethyl)cyclohexane, cis-1,2,-cyclohexanedimethanol, 1,1'-bi(cyclohexyl)-4,4'-diol, dicylcohexyl-4,4'-diol, 4,4'-dihydroxybicyclohexyl, and Poly(ethylene glycol).

Acids:

1,10-Dodecanedioic acid (DDDA), Adipic acid, Hexanedioic acid, Isophthalic acid, 1,3-Benzenedicarboxylic acid, Teraphthalic acid, 1,4-Benzenedicarboxylic acid, 2,6-Naphthalenedicarboxylic acid, 3-hydroxybenzoic acid (mHBA), and 4-hydroxybenzoic acid (pHBA).

The dihydroxy composition may also be a dihydroxy aromatic compound. A preferred dihydroxy aromatic composition of the present invention is bisphenol A (BPA). BPA has the structure:

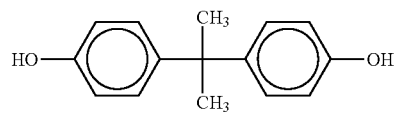

However, other dihydroxy aromatic compounds of the present invention can be used and are selected from the group consisting of bisphenols having structure II,

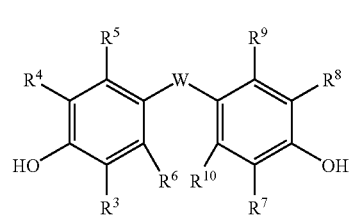

wherein $R^3$-$R^{10}$ are independently a hydrogen atom, halogen atom, nitro group, cyano group, $C_1$-$C_{20}$ alkyl radical, $C_4$-$C_{20}$ cycloalkyl radical, or $C_6$-$C_{20}$ C aryl radical; W is a bond, an oxygen atom, a sulfur atom, a $SO_2$ group, a $C_1$-$C_{20}$ aliphatic radical, a $C_6$-$C_{20}$ aromatic radical, a $C_6$-$C_{20}$ cycloaliphatic radical, or the group, $$R^{12}\diagdown_C\diagup R^{11}$$

wherein $R^{11}$ and $R^{12}$ are independently a hydrogen atom, $C_1$-$C_{20}$ alkyl radical, $C_4$-$C_{20}$ cycloalkyl radical, or $C_4$-$C_{20}$ aryl radical; or $R^{11}$ and $R^{12}$ together form a $C_4$-$C_{20}$ cycloaliphatic ring which is optionally substituted by one or more $C_1$-$C_{20}$ alkyl, $C_6$-$C_{20}$ aryl, $C_5$-$C_{21}$ aralkyl, $C_5$-$C_{20}$ cycloalkyl groups, or a combination thereof; dihydroxy benzenes having structure III,

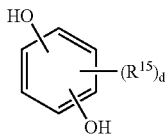

wherein $R^{15}$ is independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical, d is an integer from 0 to 4; and dihydroxy naphthalenes having structures IV and V,

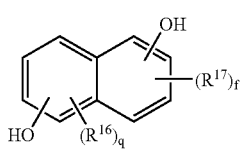

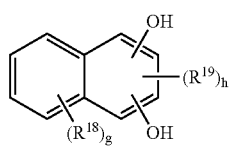

wherein $R^{16}$, $R^{17}$, $R^{18}$ and $R^{19}$ are independently at each occurrence a hydrogen atom, halogen atom, nitro group, cyano group, $C_1$-$C_{20}$ alkyl radical, $C_4$-$C_{20}$ cycloalkyl radical, or $C_4$-$C_{20}$ aryl radical; e and f are integers from 0 to 3, g is an integer from 0 to 4, and h is an integer from 0 to 2.

Suitable bisphenols II are illustrated by 2,2-bis(4-hydroxyphenyl)propane (bisphenol A); 2,2-bis(3-chloro-4-hydroxyphenyl)propane;
2,2-bis(3-bromo-4-hydroxyphenyl)propane; 2,2-bis(4-hydroxy-3-methylphenyl)propane;
2,2-bis(4-hydroxy-3-isopropylphenyl)propane; 2,2-bis(3-t-butyl-4-hydroxyphenyl)propane;
2,2-bis(3-phenyl-4-hydroxyphenyl)propane; 2,2-bis(3,5-dichloro-4-hydroxyphenyl)-propane;
2,2-bis(3,5-dibromo-4-hydroxyphenyl)propane; 2,2-bis(3,5-dimethyl-4-hydroxyphenyl)propane;
2,2-bis(3-chloro-4-hydroxy-5-methylphenyl)propane;
2,2-bis(3-bromo-4-hydroxy-5-methylphenyl)propane;
2,2-bis(3-chloro-4-hydroxy-5-isopropylphenyl)propane;
2,2-bis(3-bromo-4-hydroxy-5-isopropylphenyl)propane;
2,2-bis(3-t-butyl-5-chloro-4-hydroxyphenyl)propane;
2,2-bis(3-bromo-5-t-butyl-4-hydroxyphenyl)propane;
2,2-bis(3-chloro-5-phenyl-4-hydroxyphenyl)propane;
2,2-bis(3-bromo-5-phenyl-4-hydroxyphenyl)propane;
2,2-bis(3,5-disopropyl-4-hydroxyphenyl)propane;
2,2-bis(3,5-di-t-butyl-4-hydroxyphenyl)propane; 2,2-bis(3,5-diphenyl-4-hydroxyphenyl)propane;
2,2-bis(4-hydroxy-2,3,5,6-tetrachlorophenyl)propane;
2,2-bis(4-hydroxy-2,3,5,6-tetrabromophenyl)propane;
2,2-bis(4-hydroxy-2,3,5,6-tetramethylphenyl)propane;
2,2-bis(2,6-dichloro-3,5-dimethyl-4-hydroxyphenyl)propane;
2,2-bis(2,6-dibromo-3,5-dimethyl-4-hydroxyphenyl)propane;
1,1-bis(4-hydroxyphenyl)cyclohexane; 1,1-bis(3-chloro-4-hydroxyphenyl)cyclohexane;
1,1-bis(3-bromo-4-hydroxyphenyl)cyclohexane; 1,1-bis(4-hydroxy-3-methylphenyl)cyclohexane;
1,1-bis(4-hydroxy-3-isopropylphenyl)cyclohexane;
1,1-bis(3-t-butyl-4-hydroxyphenyl)cyclohexane; 1,1-bis(3-phenyl-4-hydroxyphenyl)cyclohexane;
1,1-bis(3,5-dichloro-4-hydroxyphenyl)cyclohexane;
1,1-bis(3,5-dibromo-4-hydroxyphenyl)cyclohexane;
1,1-bis(3,5-dimethyl-4-hydroxyphenyl)cyclohexane;
1,1-bis(3-chloro-4-hydroxy-5-methylphenyl)cyclohexane;
1,1-bis(3-bromo-4-hydroxy-5-methylphenyl)cyclohexane;
1,1-bis(3-chloro-4-hydroxy-5-isopropylphenyl)cyclohexane;
1,1-bis(3-bromo-4-hydroxy-5-isopropylphenyl)cyclohexane;
1,1-bis(3-t-butyl-5-chloro-4-hydroxyphenyl)cyclohexane;
1,1-bis(3-bromo-5-t-butyl-4-hydroxyphenyl)cyclohexane;
1,1-bis(3-chloro-5-phenyl-4-hydroxyphenyl)cyclohexane;
1,1-bis(3-bromo-5-phenyl-4-hydroxyphenyl)cyclohexane;
1,1-bis(3,5-disopropyl-4-hydroxyphenyl)cyclohexane;
1,1-bis(3,5-di-t-butyl-4-hydroxyphenyl)cyclohexane;
1,1-bis(3,5-diphenyl-4-hydroxyphenyl)cyclohexane;
1,1-bis(4-hydroxy-2,3,5,6-tetrachlorophenyl)cyclohexane;
1,1-bis(4-hydroxy-2,3,5,6-tetrabromophenyl)cyclohexane;
1,1-bis(4-hydroxy-2,3,5,6-tetramethylphenyl)cyclohexane;
1,1-bis(2,6-dichloro-3,5-dimethyl-4-hydroxyphenyl)cyclohexane;
1,1-bis(2,6-dibromo-3,5-dimethyl-4-hydroxyphenyl)cyclohexane;
1,1-bis(4-hydroxyphenyl)-3,3,5-trimethylcyclohexane;
1,1-bis(3-chloro-4-hydroxyphenyl)-3,3,5-trimethylcyclohexane;
1,1-bis(3-bromo-4-hydroxyphenyl)-3,3,5-trimethylcyclohexane;
1,1-bis(4-hydroxy-3-methylphenyl)-3,3,5-trimethylcyclohexane;
1,1-bis(4-hydroxy-3-isopropylphenyl)-3,3,5-trimethylcyclohexane;
1,1-bis(3-t-butyl-4-hydroxyphenyl)-3,3,5-trimethylcyclohexane;
1,1-bis(3-phenyl-4-hydroxyphenyl)-3,3,5-trimethylcyclohexane;
1,1-bis(3,5-dichloro-4-hydroxyphenyl)-3,3,5-trimethylcyclohexane;
1,1-bis(3,5-dibromo-4-hydroxyphenyl)-3,3,5-trimethylcyclohexane;
1,1-bis(3,5-dimethyl-4-hydroxyphenyl)-3,3,5-trimethylcyclohexane;
1,1-bis(3-chloro-4-hydroxy-5-methylphenyl)-3,3,5-trimethylcyclohexane;
1,1-bis(3-bromo-4-hydroxy-5-methylphenyl)-3,3,5-trimethylcyclohexane;
1,1-bis(3-chloro-4-hydroxy-5-isopropylphenyl)-3,3,5-trimethylcyclohexane;
1,1-bis(3-bromo-4-hydroxy-5-isopropylphenyl)-3,3,5-trimethylcyclohexane;
1,1-bis(3-t-butyl-5-chloro-4-hydroxyphenyl)-3,3,5-trimethylcyclohexane;
1,1-bis(3-bromo-5-t-butyl-4-hydroxyphenyl)-3,3,5-trimethylcyclohexane;
bis(3-chloro-5-phenyl-4-hydroxyphenyl)-3,3,5-trimethylcyclohexane;
1,1-bis(3-bromo-5-phenyl-4-hydroxyphenyl)-3,3,5-trimethylcyclohexane;
1,1-bis(3,5-disopropyl-4-hydroxyphenyl)-3,3,5-trimethylcyclohexane;
1,1-bis(3,5-di-t-butyl-4-hydroxyphenyl)-3,3,5-trimethylcyclohexane;

1,1-bis(3,5-diphenyl-4-hydroxyphenyl)-3,3,5-trimethylcyclohexane;
1,1-bis(4-hydroxy-2,3,5,6-tetrachlorophenyl)-3,3,5-trimethylcyclohexane;
1,1-bis(4-hydroxy-2,3,5,6-tetrabromophenyl)-3,3,5-trimethylcyclohexane;
1,1-bis(4-hydroxy-2,3,5,6-tetramethylphenyl)-3,3,5-trimethylcyclohexane;
1,1-bis(2,6-dichloro-3,5-dimethyl-4-hydroxyphenyl)-3,3,5-trimethylcyclohexane;
1,1-bis(2,6-dibromo-3,5-dimethyl-4-hydroxyphenyl)-3,3,5-trimethylcyclohexane;
4,4'dihydroxy-1,1-biphenyl; 4,4'-dihydroxy-3,3'-dimethyl-1,1-biphenyl;
4,4'-dihydroxy-3,3'-dioctyl-1,1-biphenyl; 4,4'-dihydroxydiphenylether;
4,4'-dihydroxydiphenylthioether; 1,3-bis(2-(4-hydroxyphenyl)-2-propyl)benzene;
1,3-bis(2-(4-hydroxy-3-methylphenyl)-2-propyl)benzene;
1,4-bis(2-(4-hydroxyphenyl)-2-propyl)benzene and
1,4-bis(2-(4-hydroxy-3-methylphenyl)-2-propyl)benzene.

Suitable dihydroxy benzenes III are illustrated by hydroquinone, resorcinol, methylhydroquinone, butylhydroquinone, phenylhydroquinone, 4-phenylresorcinol and 4-methylresorcinol.

Suitable dihydroxy naphthalenes IV are illustrated by 2,6-dihydroxy naphthalene; 2,6-dihydroxy-3-methyl naphthalene; and 2,6-dihydroxy-3-phenyl naphthalene.

Suitable dihydroxy naphthalenes V are illustrated by 1,4-dihydroxy naphthalene; 1,4-dihydroxy-2-methyl naphthalene; 1,4-dihydroxy-2-phenyl naphthalene and 1,3-dihydroxy naphthalene.

If an additional monomer is used it is preferred that the DMBPC monomer of structure I be incorporated into the polycarbonate at greater than 25% by weight to the entire weight of the polycarbonate, more preferably in an amount great than 50%, and more preferably in an amount greater than 75% by weight.

Blends of polymers are typical in industry. Thus the DMBPC polycarbonate of the present invention may be blended with other polymeric materials, for example, other polycarbonates, polyestercarbonates, polyesters and olefin polymers such as ABS.

Further, the polycarbonates of the present invention may be blended with conventional additives such as heat stabilizers, mold release agents, and UV stabilizers, flame retardants, infrared shielding agents, whitening agents, thermal stabilizers, antioxidants, light stabilizers, plasticizers, colorants, extenders, antistatic agents, catalyst quenchers, mold releasing agents, additional resin, blowing agents, and processing aids.

The present invention also provides an article comprising: a layered sheet comprising: a substrate, and a first coplanar layer, wherein the first layer comprises polycarbonate comprising repeat units derived from the DMBPC monomer of structure I, wherein at least 20% of the surface area of the article is transparent. This means that when one looks through an article of the present invention from one major surface to another, one can see a clearly defined image of an object located on the other side through at least 20% the first surface. It is often preferred that the surface area of the article be at least 40% and more preferably at least 60% transparent. It is often preferred that the substrate comprises polycarbonate wherein the polycarbonate may or may not include repeat units derived from a monomer of structure I. Another embodiment provides an article with a coplanar second layer disposed on the first layer away from the substrate. As described above it is often preferred that this second layer be a coating layer such as a hard coat layer.

In a further embodiment the present invention also provides a method of forming a window wherein the window comprises: a frame, and a first sheet, wherein the first sheet is supported by the frame and comprises a first layer, and wherein the first layer comprises polycarbonate comprising repeat units derived from the DMBPC monomer of structure I; and wherein the method comprises the steps of: (i) forming the first sheet; and (ii) supporting the first sheet with the frame, thereby forming a window.

Figure 8:
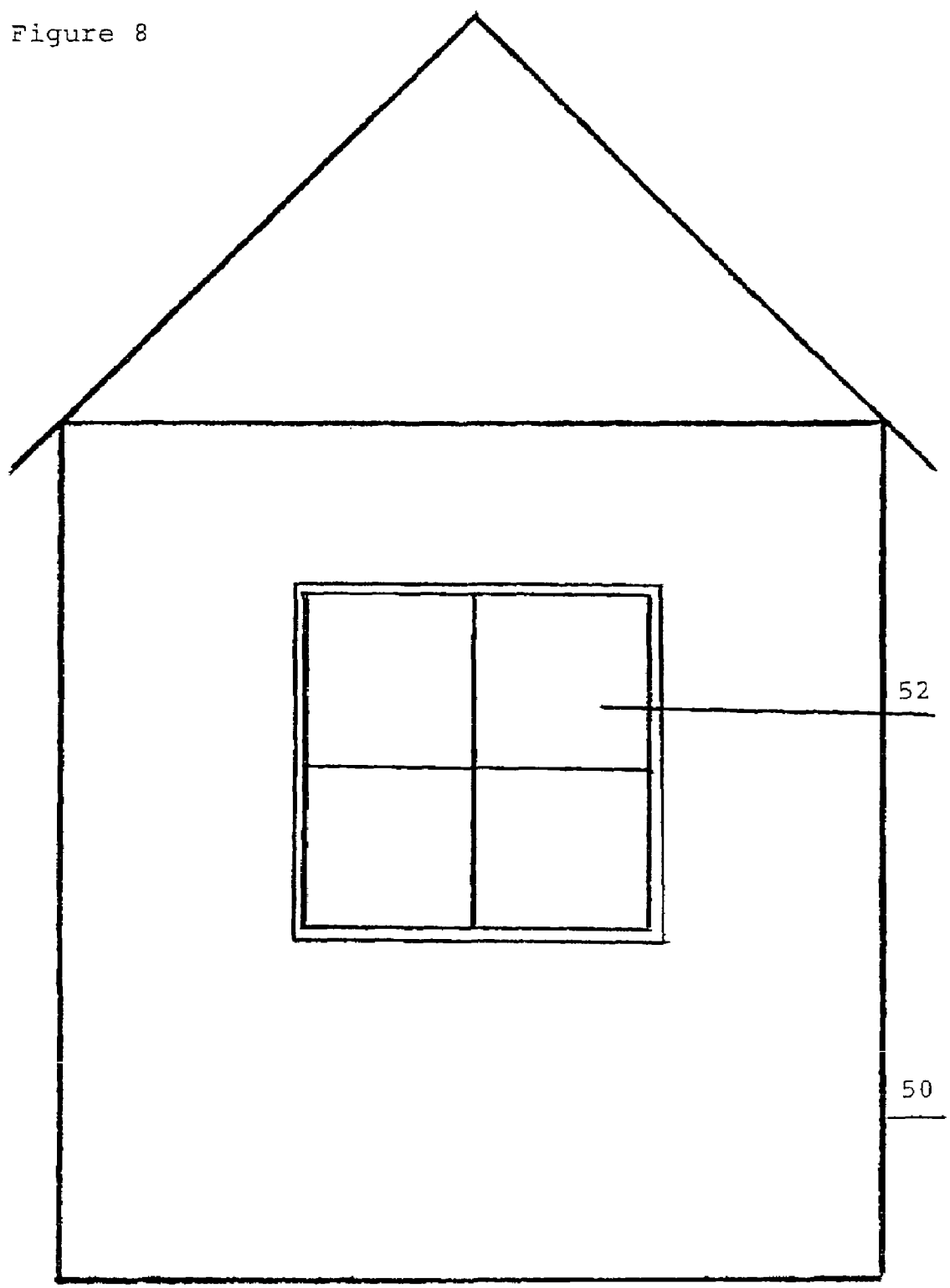
FIG. 8 shows a building with a window of the present invention.

In another embodiment the invention provides an enclosure comprising a window, wherein the window comprises: a frame; and a first sheet supported by the frame, wherein the first comprises a first layer, wherein the first layer comprises polycarbonate, wherein the polycarbonate of the first layer comprises repeat units derived from the DMBPC monomer of structure I. The enclosure of the present invention may be a building. FIG. 8 depicts an enclosure, here building 50, of the present invention wherein building 50 comprises the window 52 described above. The building described in this embodiment may suitably be situated in an agricultural environment, for example on a farm such as an animal stable such as a pig stable, or another environment that has an elevated concentration of ammonia.

In another embodiment a method of improving the scratch resistance and base resistance, such as resistance against ammonia, of polycarbonate is provided comprising the step of incorporating into the polycarbonate repeat units derived from a monomer of structure I. The method may further comprise the step of adding a coating layer to the polycarbonate wherein the coating layer is described above.

Figure 7:
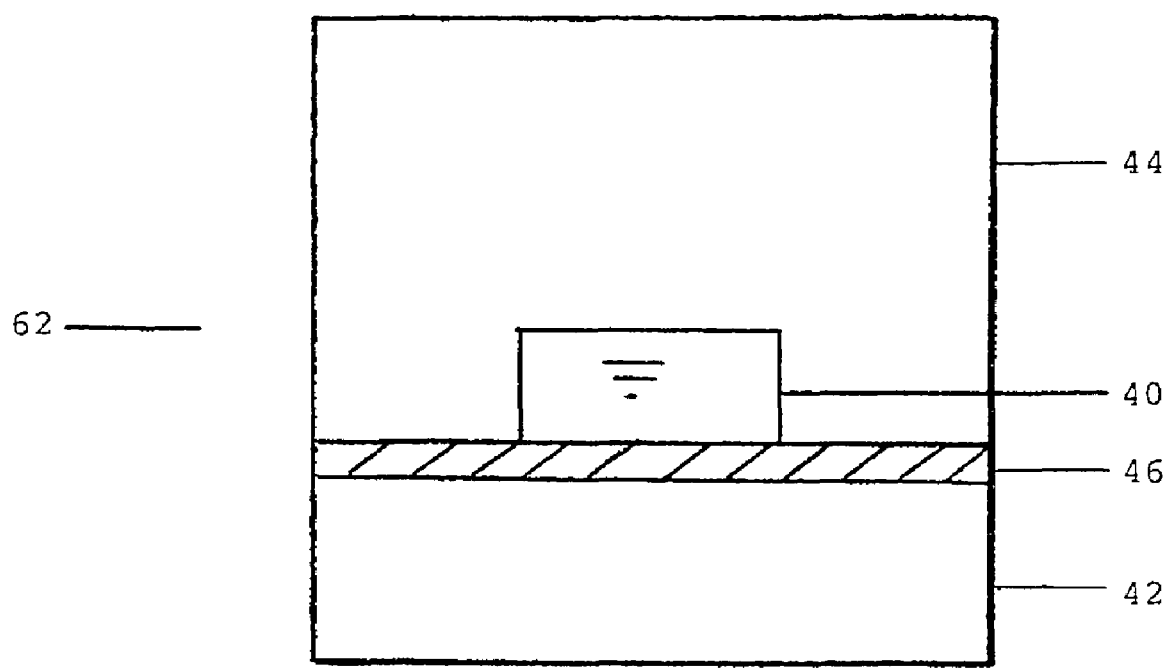
FIG. 7 shows an enclosed electrical fixture of the present invention.
Figure 9:
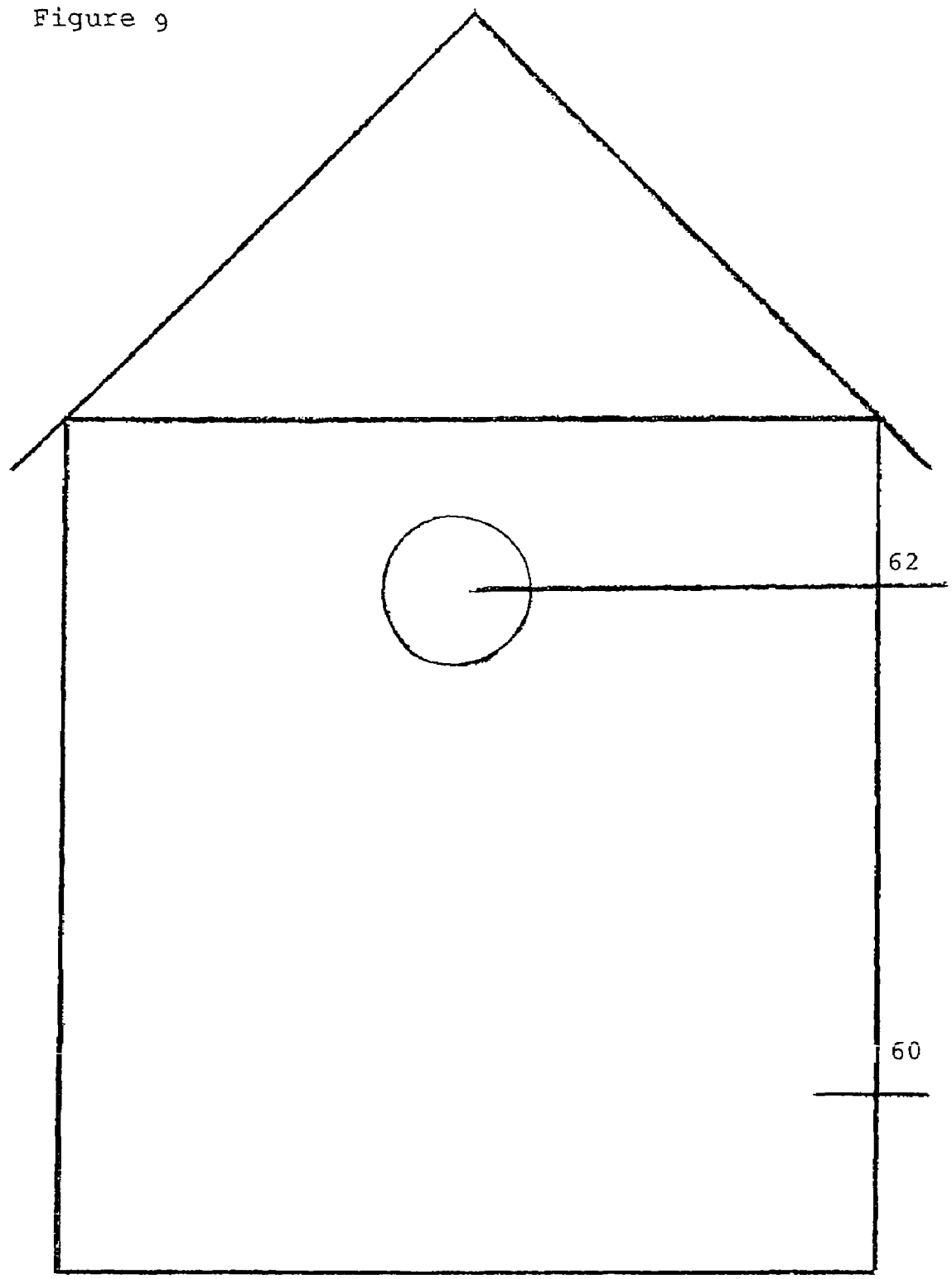
FIG. 9 shows a building with an enclosed electrical fixture of the present invention.

As depicted in FIG. 7, the present invention also provides an enclosed electrical fixture 62 having: an electrical fixture 40, a base 42, and a cover 44, wherein the cover 44 is supported by the base 42 and the electrical fixture 40 is enclosed between the cover 44 and the base 42. The cover 44 comprises a first layer, wherein the first layer comprises a polycarbonate comprising repeat units derived from the DMBPC monomer of structure I. The electrical fixture 40 can be, for example, a socket capable of receiving an illuminating device such as a light bulb or a fluorescent tube, a surveillance fixture capable of receiving a surveillance camera, a switch fixture, a plug receiver capable of receiving a plug, or any other electrical fixture that can be enclosed by a cover and a base. It is preferred that the cover 44 be detachable from the base 42 such that access to the electrical fixture 40 can be obtained. It is also sometimes preferred that the enclosed electrical fixture 40 of the present invention also comprise a sealing system 46 capable of sealing the cover 44 to the base 42 to prevent harmful gases to reach the electrical fixture 40 enclosed between the cover 44 and the base 42. This sealing system 46 is not limited and can be, for example, an o-ring disposed between the base 42 and the cover 44 wherein a seal 46 between the base 42 and cover 44 is created when the cover 44 is supported by the base 42. The supporting part of the base 42 which supports the cover 44 is not particularly limited and may include, for example, a screw and thread system wherein the cover 44 is screwed into the base 42, a lock and key arrangement, a male-female interaction, or a latch securing system. In a further embodiment the base 42 is also made from polycarbonate comprising repeat units derived from the monomer of structure 1. The present invention also provides a building comprising this type of enclosed electrical fixture 62. FIG. 9 depicts an enclosure, here building 60, comprising the enclosed electrical fixture 62 described above.

The method of forming the sheets and articles formed from the sheets comprising the DMBPC monomer of the present invention are not particularly limited. For example the sheets and articles may be formed by, inter alia, the processes of lamination, injection molding, blow molding, extrusion, and/or coextrusion.

EXAMPLES

Having described the invention in detail, the following examples are provided. The examples should not be considered as limiting the scope of the invention, but merely as illustrative and representative thereof.

Molecular weights were determined by GPC analysis of solutions of the polymers dissolved in chloroform. Molecular weight results are given as values relative to PS and PC.

Molecular weight degradation resistance was evaluated by exposing parts made from the example plastic resin compositions to ammonia vapor. Exposure was carried out by placing the parts in an enclosed container in an atmosphere saturated with the vapor generated from an aqueous ammonia solution. The molecular weight of the polycarbonate of the part was measured after the ammonia vapor exposure, and the degree degradation due to hydrolysis is thus the change in molecular weight.

Ammonia resistance of multi-layer sheets was determined by covering a beaker filled with an aqueous ammonia solution by the part with the side to be evaluated facing the solution.

Scratch resistance was evaluated by dragging a stylus pin on the surface of parts made from the example plastic resin compositions at a constant load of 6 N and measuring the depth of the scratches produced. Higher pencil hardness and shallower scratches (lower scratch depths) indicate better scratch resistance. Abrasion resistance was evaluated by subjecting parts made from the example plastic resins to the abrasion protocol of the Taber Abrasion test, according to ASTM D 1044. After 100 cycles of abrasion, the optical haze of the parts were measured. The less haze generated during the abrasion, the better the abrasion resistance.

Examples 1-8 and comparative examples 1-5 below depict the scratch resistance and ammonia resistance properties of the uncoated DMBPC polycarbonate of the present invention as compared to traditional uncoated BPA polycarbonate of the prior art.

Examples 1-8

Example 1

Copolycarbonate resin of 50/50 DMBPC/BPA synthesized via the interfacial phosgene process.

Example 2

Copolycarbonate resin of 50/50 DMBPC/BPA synthesized via the interfacial phosgene process.

Example 3

Copolymer polycarbonate resin of 50/50 DMBPC/BPA synthesized via the interfacial phosgene process.

Example 4

Copolymer polycarbonate resin of 25/75 DMBPC/BPA synthesized via the interfacial phosgene process.

Example 5

Copolymer polycarbonate resin of 25/75 DMBPC/BPA synthesized via the interfacial phosgene process.

Example 6

Copolymer polycarbonate resin of 25/75 DMBPC/BPA synthesized via the interfacial phosgene process.

Example 7

DMBPC homopolymer polycarbonate resin synthesized via the melt DPC process.

Example 8

Copolymer polycarbonate resin of 50/50 DMBPC/BPA synthesized via the melt DPC process.

Comparative Examples 1-5

Comparative Example 1

Commercially produced BPA polycarbonate homopolymer.

Comparative Example 2

Commercially produced BPA polycarbonate homopolymer.

Comparative Example 3

Commercially produced BPA polycarbonate homopolymer.

Comparative Example 4

Commercially produced BPA polycarbonate homopolymer.

Comparative Example 5

Commercially produced BPA polycarbonate homopolymer.

NOTE: All starting materials, as described above (i.e. Examples 1-8 and Comparative Examples 1-5), were completely transparent prior to conducting tests. The properties of the examples and comparative examples before and after $M_w$ degradation resistance and scratch/abrasion resistance tests were performed are summarized in Tables 1-2 and graphically represented in FIGS. 11-15.

TABLE 1

Data showing improvements in $M_w$ degradation resistance & scratch/abrasion resistance

| Property | Units | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| Composition DMBPC/BPA | mol % | 50/50 | 50/50 | 50/50 | 25/75 | 25/75 | 25/75 | 0/100 | 0/100 | 0/100 |
| Initial Mw (PS) | g/mol | 41100 | 53300 | 63300 | 51500 | 61000 | 75900 | 41300 | 51100 | 61400 |
| Initial Mw (PC) | g/mol | 21200 | 26600 | 31000 | 25800 | 30000 | 38400 | 21300 | 25600 | 30200 |
| Molecular Weight Degradation After Exposure to Ammonia ||||||||||||
| 2.5% Ammonia Solution, 3 days | % Δ Mw | −1.7 | −2.7 | −2.6 | −5.5 | −6.5 | −9.2 | −8.6 | −11.7 | −11.1 |
| 10% Ammonia Solution, 1 day | % Δ Mw | −2.5 | −5.1 | −5.5 | −8.1 | −9.9 | −9.4 | −11.0 | −10.6 | −11.8 |
| 10% Ammonia Solution, 1 day | Visual | no change, clear & transp. | no change, clear & transp. | no change, clear & transp. | no change, clear & transp. | slightly hazy | slightly hazy | opaque white, sticky surface | opaque white, sticky surface | opaque white, sticky surface |
| Scratch & Abrasion Resistance ||||||||||||
| Scratch Depth, 6 N | microns | 13 | 13 | 13 | 17 | 16 | 16 | 24 | 25 | 24 |
| Taber Abrasion, 100 cycles | % Haze | 25.9 | 25.5 | 22.8 | 26.1 | 27.0 | 28.0 | 31.3 | 33.7 | 32.4 |

TABLE 2

Data showing improvements in $M_w$ degradation resistance & scratch/abrasion resistance

| Property | Units | Ex. 7 | Ex. 8 | Comp. Ex. 4 | Comp. Ex. 5 |
|---|---|---|---|---|---|
| Composition DMBPC/BPA | mol % | 100/0 | 50/50 | 0/100 | 0/100 |
| Initial Mw (PS) | g/mol | 44800 | 47600 | 62700 | NT |
| 2.3% Ammonia Solution, 1 day | % Δ Mw | 0.9 | −3.2 | −7.8 | NT |
| 2.3% Ammonia Solution, 2 days | % Δ Mw | 1.2 | −3.9 | −13.8 | NT |
| 2.3% Ammonia Solution, 3 days | % Δ Mw | 1.1 | −4.5 | −13.9 | NT |
| 25% Ammonia Solution, 1 day | visual | No change, clear & transparent | Slightly Hazy | NT | Complete disintegration of part |
| Scratch Depth, 6 N | micron | 8.5 | NT | 27 | NT |

NT = not tested

Results (Examples 1-8): Examples 1-8 demonstrate that a polycarbonate comprising repeat units derived from DMBPC monomers exhibits superior $M_w$ degradation resistance and scratch resistance properties as compared to a polycarbonate formed from traditional BPA monomers. The results of the above test are graphically displayed in FIGS. 11-15.

Figure 11:
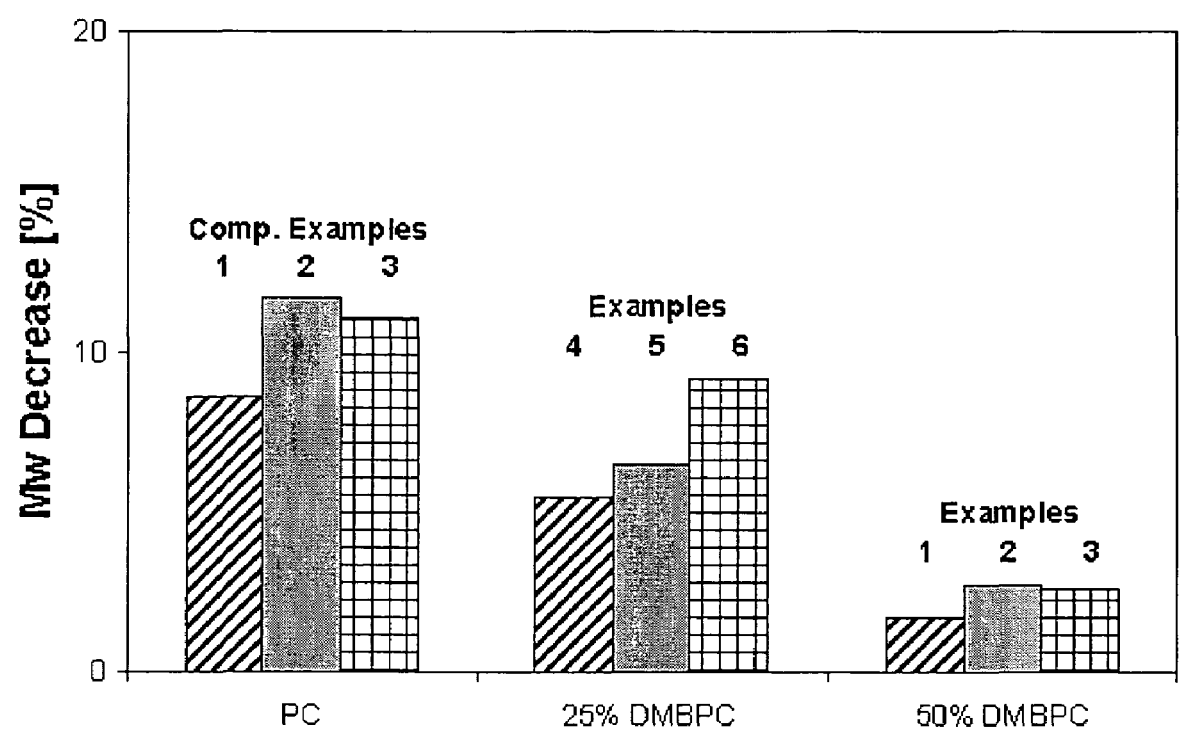
FIG. 11 is a graph showing the molecular weight degradation after exposure to vapors from a 2.5% ammonia solution for 3 days (Comparative Examples 1-3 and Examples 1-6).

FIG. 11 is a graph showing the molecular weight degradation after exposure to vapors from a 2.5% ammonia solution for 3 days (Comparative Examples 1-3 and Examples 1-6).

Figure 12:
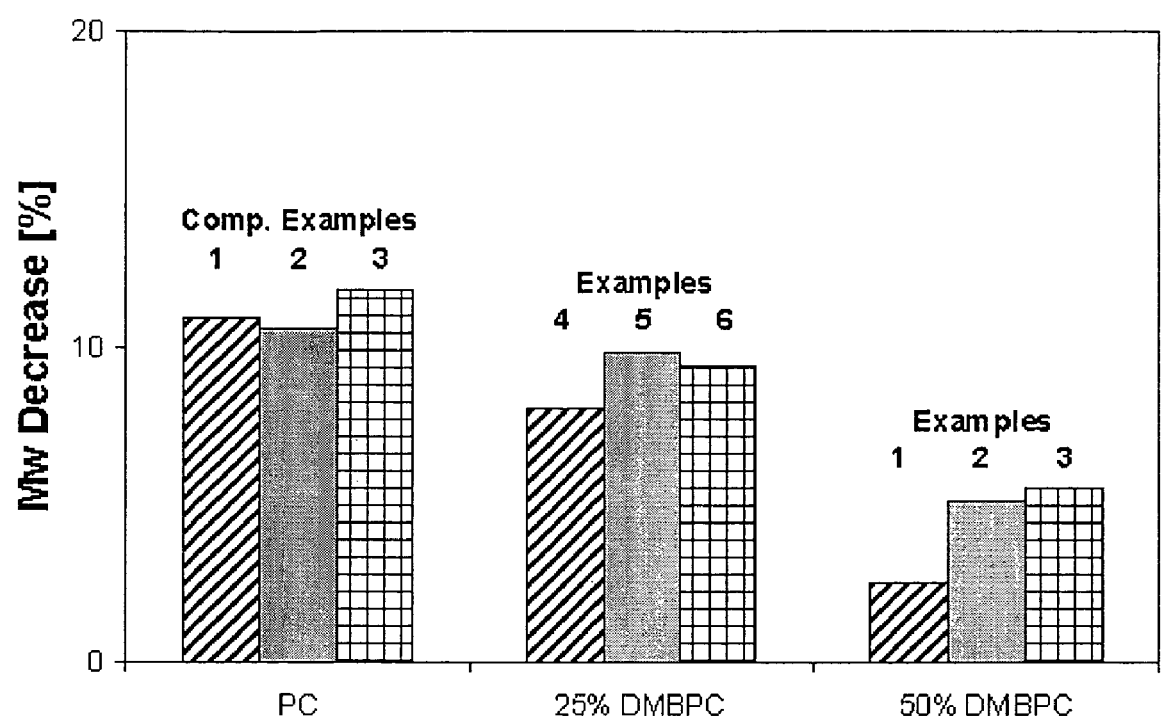
FIG. 12 is a graph showing the molecular weight degradation after exposure to vapors from a 10% ammonia solution for 1 day (Comparative Examples 1-3 and Examples 1-6).

FIG. 12 is a graph showing the molecular weight degradation after exposure to vapors from a 10% ammonia solution for 1 day (Comparative Examples 1-3 and Examples 1-6).

Figure 13:
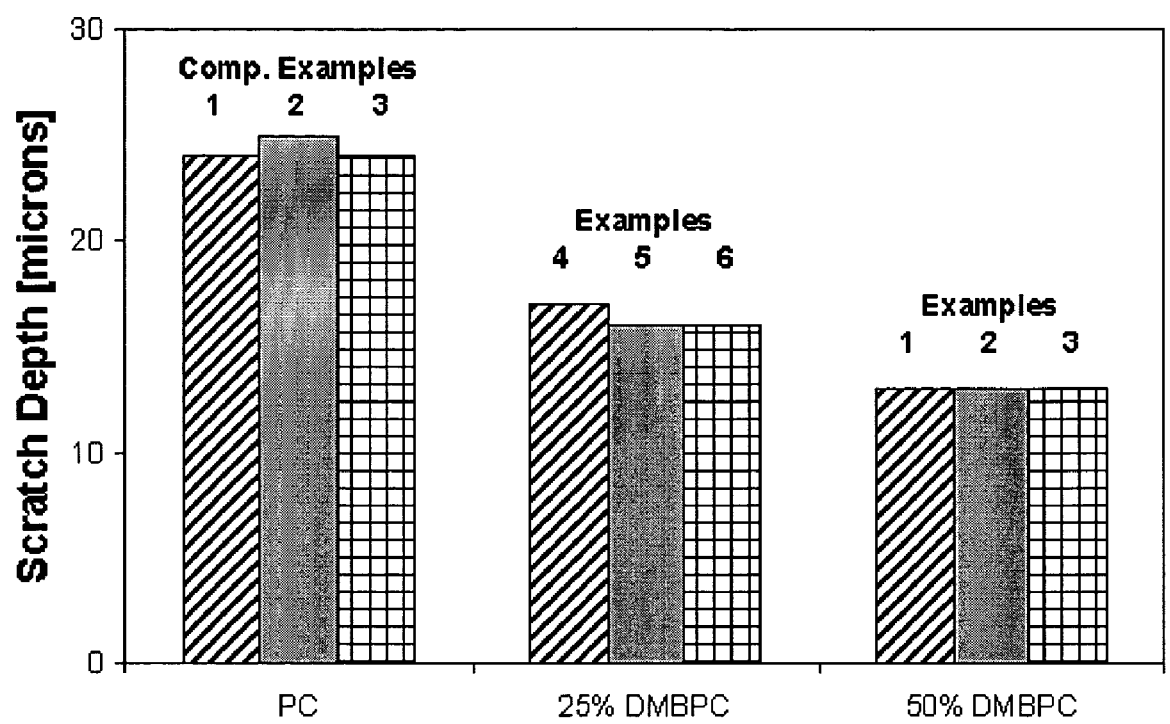
FIG. 13 is a graph showing the scratch depth caused by dragging a stylus across the samples at a constant vertical scratch force of 6 N (Comparative Examples 1-3 and Examples 1-6).

FIG. 13 is a graph showing the scratch depth caused by dragging a stylus across the samples at a constant vertical scratch force of 6 N (Comparative Examples 1-3 and Examples 1-6).

Figure 14:
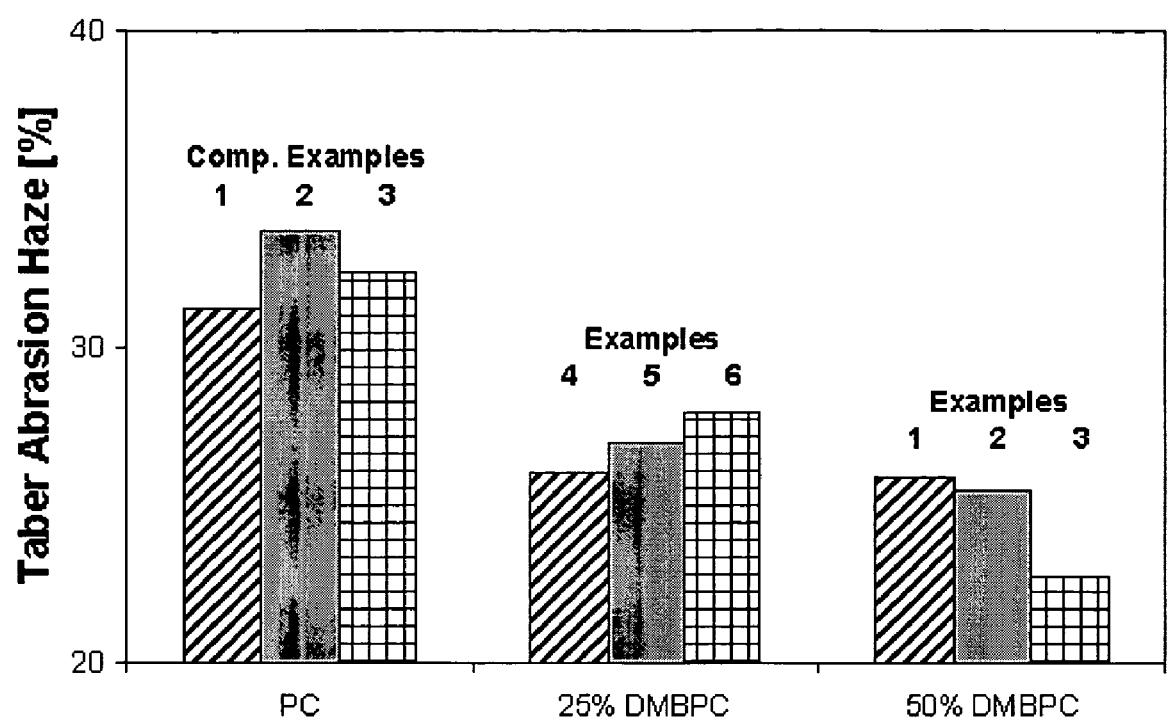
FIG. 14 is a graph showing the haze after 100 cycles of Taber abrasion (Comparative Examples 1-3 and Examples 1-6).

FIG. 14 is a graph showing the haze after 100 cycles of Taber abrasion (Comparative Examples 1-3 and Examples 1-6).

Figure 15:
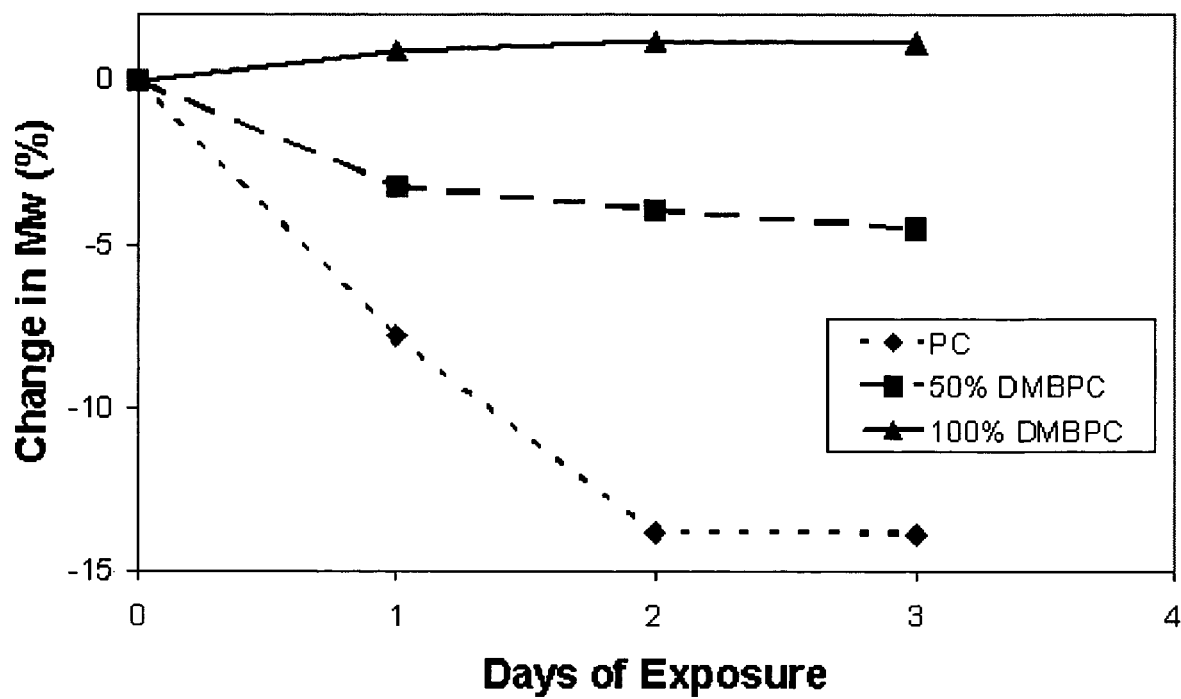
FIG. 15 is a graph showing the molecular weight degradation during exposure to vapors from a 2.3% ammonia solution over 3 days (Comparative Example 4 and Examples 7 & 8).

FIG. 15 is a graph showing the molecular weight degradation during exposure to vapors from a 2.3% ammonia solution over 3 days (Comparative Example 4 and Examples 7 & 8).

Examples 9-14

The resin as described in examples 9-11 was applied as a co-extruded layer on top of a sheet of commercial PC. The multi-layer sheets were made by a coextrusion process in which each layer was molten in an extruder, both melts were combined in a heated feedblock and the combined layers were extruded to a sheet in a 'coathanger' die. After extrusion the molten sheet was calandered between heated, polished metal rolls and cooled by air and then tested. In examples 12-14, the sheets were coated by taking the respective multi-layer sheet and flowing a primer coating, in this case SHP401 obtained from GE Bayer Silicones, vertically over the sheet and drying the sheet at room temperature for at least 20 minutes. Subsequently a silicon hard coat, in this case AS4000 obtained from GE Bayer Silicones, was flowed vertically over the primed sheet, it was dried for 20 minutes at room temperature and cured for 90 minutes at 130° C. in an oven and then tested.

Example 9

Copolycarbonate resin of 50/50 mol % DMBPC/BPA synthesized via the melt process blended with 10 wt. % of UV stabilizer 3030.

Example 10

DMBPC homopolymer synthesized via the melt process blended with 20 wt. % of ITR/BPA copolymer.

Example 11

DMBPC homopolymer synthesized via the melt process blended with 10 wt. % of UV stabilizer 3030.

Example 12

AS4000 coating applied over the blended copolycarbonate resin of example 9.

Example 13

AS4000 coating applied over the blended polycarbonate resin of example 10.

Example 14

AS4000 coating applied over the blended polycarbonate resin of example 11.

Comparative Examples 6-7

Comparative Example 6

Commercially produced BPA polycarbonate homopolymer.

Comparative Example 7

AS4000 coating applied over the commercially produced BPA polycarbonate homopolymer of comparative example 6.

TABLE 3

(Comparative Examples 6-7 and Examples 9-14) Data showing improvements in scratch resistance (given as scratch depth [micrometers] at 6 N of force and pencil hardness at 1 kgf) of the DMBPC polycarbonate of the present invention as compared to traditional BPA polycarbonate.

| Example # | Depth [μm] at 6 N | Pencil Hardness at 1 kgf |
|---|---|---|
| Comp. Ex. 6 (BPA-PC) | 25.0 | 2B |
| Ex. 9 (45% DMBPC) | 14.5 | F |
| Ex. 10 (50% DMBPC) | 14.0 | H |
| Ex. 11 (90% DMBPC) | 9.5 | 2H |
| Comp. Ex. 7 (PC Sheet w/ AS4000 coat) | 28.0 | F |
| Ex. 12 (45% DMBPC, w/ AS4000 coat) | 18.1 | 2H |
| Ex. 13 (50% DMBPC, w/ AS4000 coat) | 18.1 | 2H |
| Ex. 14 (90% DMBPC, w/ AS4000 coat) | 14.5 | 4H |

Results (Examples 9-14): Examples 9-14 demonstrate that a polycarbonate comprising repeat units derived from DMBPC monomers, that further comprises a coating layer, exhibits superior pencil hardness and decreased scratch depth as compared to polycarbonate formed from traditional BPA monomers with the same coating layer (i.e. comparative examples). The results of the above test are graphically displayed in FIGS. 16-17.

Figure 16:
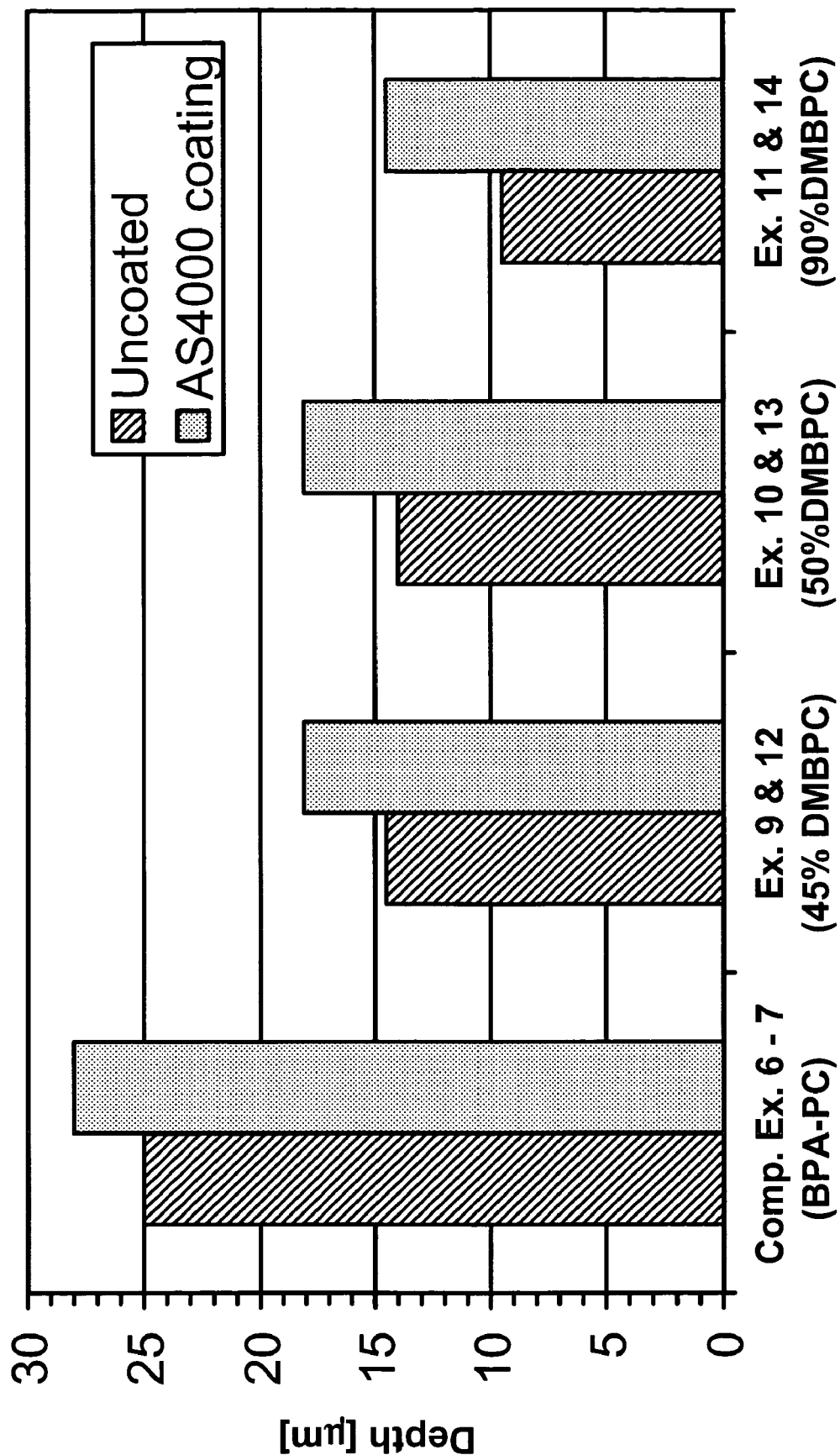
FIG. 16 is a graph showing the scratch depth at 6 N of 4 different polycarbonate configurations with various hard coat configurations. (Comparative examples 6-7 and Examples 9-14).

FIG. 16 is a graph showing the scratch depth at 6 N of an 4 different polycarbonate configurations with various hard coat layers. (Comparative examples 6-7 and Examples 9-14).

Figure 17:
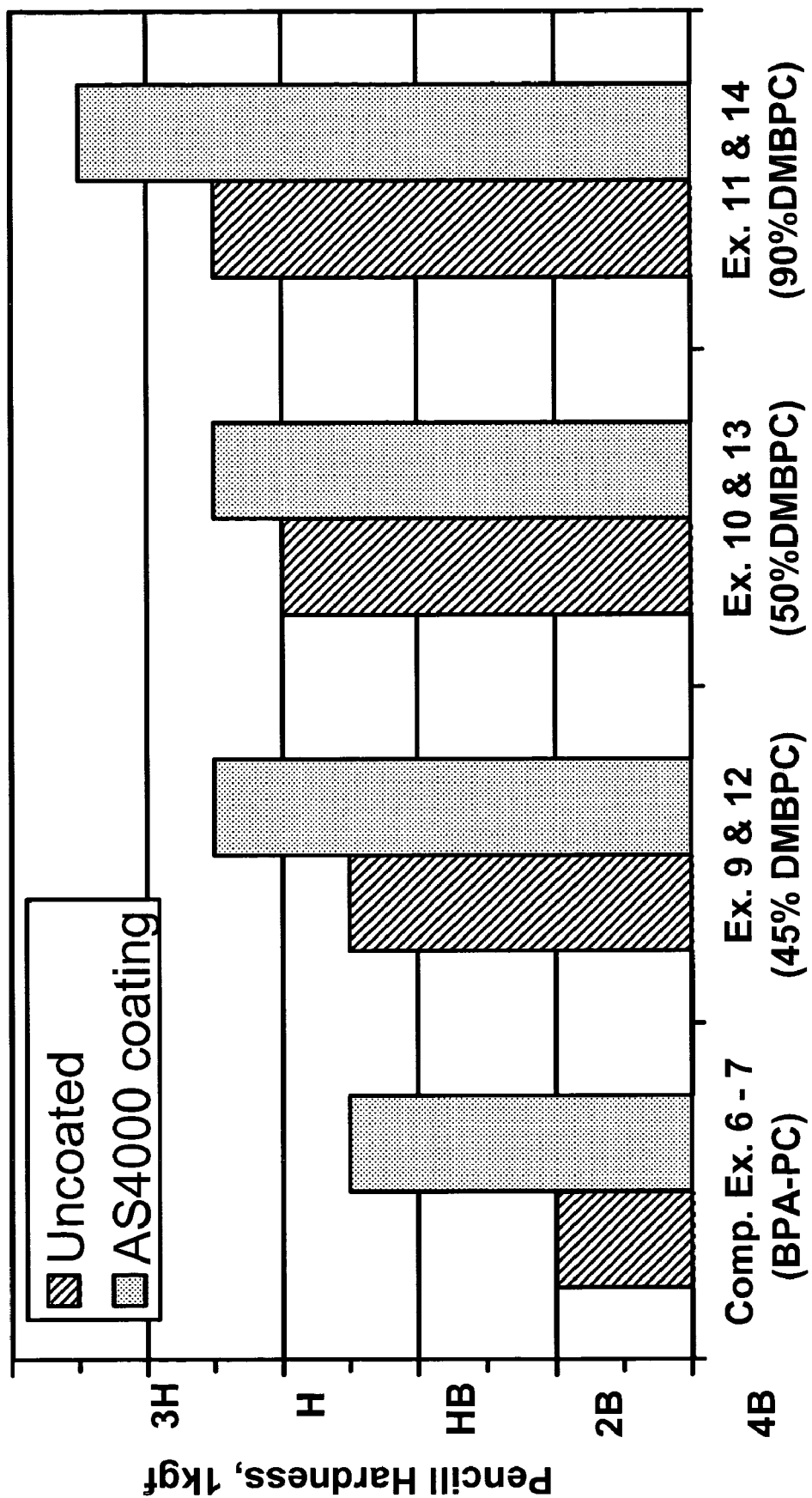
FIG. 17 is a graph showing the pencil hardness of 4 different polycarbonate configurations with various hard coat configurations (Comparative examples 6-7 and Examples 9-14).

FIG. 17 is a graph showing the pencil hardness of 4 different polycarbonate configurations with various hard coat configurations (Comparative examples 6-7 and Examples 9-14).

Examples 15-19 and Comparative Example 8

Examples 15-19 as illustrated in Table 4 show improvements in scratch resistance of traditional BPA polycarbonate that has a cap layer comprising DMBPC. Here comparative example 8 has a cap layer of traditional BPA polycarbonate while examples 15-19 demonstrate the benefit of a copolymer cap layer comprising repeat units derived from DMBPC (examples 15-18) and also of a homopolymer cap layer derived from DMBPC (example 19).

TABLE 4

Data showing improvements in scratch resistance (given as scratch depth [micrometers] at 6 N) of molded plaques and multi-layer sheets consisting of a BPA-PC substrate and different cap layers.

| Sample | Molded Part | Multi-layer sheet |
|---|---|---|
| Comp. Ex. 8. BPA-PC | 24.8 | 25.3 |
| Ex. 15: 25% DMBPC | 16.8 | |
| Ex. 16: 45% DMBPC | 14.5 | 14.5 |
| Ex. 17: 50% DMBPC | 13.0 | |
| Ex. 18: 90% DMBPC | 10.0 | 9.5 |
| Ex. 19: 100% DMBPC | 8.9 | |

The invention claimed is:

1. A window comprising:
   a frame, and
   a first sheet supported by the frame, wherein the first sheet comprises a first layer, and wherein the first layer comprises polycarbonate comprising repeat units derived from a monomer of structure I:

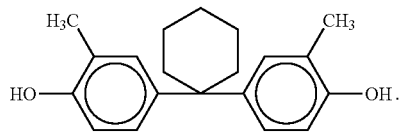

2. The window of claim 1, wherein the first sheet is transparent.

3. The window of claim 1, wherein the first sheet has an inner side and an outer side and wherein the first sheet further comprises a coplanar substrate wherein the substrate is on the inner side and the first layer is on the outer side.

4. The window of claim 3, wherein the substrate comprises polycarbonate.

5. The window of claim 3, wherein the first sheet is transparent.

6. The window of claim 3, wherein the first sheet further comprises a coplanar second layer, and wherein the second layer is disposed over the first layer on the outer side of the first sheet.

7. The window of claim 6, wherein the substrate comprises polycarbonate.

8. The window of claim 6, wherein the second layer is a coating layer.

9. The window of claim 8, wherein the coating is selected from the group consisting of silicone hard coats, acrylate hard coats, silicone hard coats with acrylate primers, polyurethane hard coats, and melamine hard coats.

10. The window of claim 6, wherein the first sheet is transparent.

11. The window of claim 3, wherein the first sheet further comprises a coplanar third layer wherein the third layer is disposed on the substrate on the inner side of the first sheet, and wherein the third layer comprises polycarbonate comprising repeat units derived from a monomer of structure I:

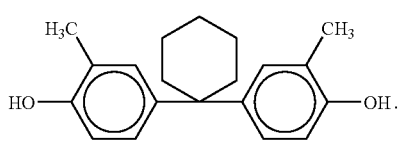

I

12. The window of claim 11, wherein the substrate comprises polycarbonate.

13. The window of claim 11, wherein the first sheet is transparent.

14. The window of claim 11, wherein the first sheet further comprises a second layer, and wherein the second layer is disposed over the first layer on the outer side of the first sheet.

15. The window of claim 14, wherein the substrate comprises polycarbonate.

16. The window of claim 14, wherein the first sheet is transparent.

17. The window of claim 14, wherein the second layer is a coating layer.

18. The window of claim 17, wherein the coating is selected from the group consisting of silicone hard coats, acrylate hard coats, silicone hard coats with acrylate primers, polyurethane hard coats, and melamine hard coats.

19. The window of claim 17, wherein the first sheet is transparent.

20. The window of claim 11, wherein the first sheet further comprises a fourth layer, and wherein the fourth layer is disposed over the third layer on the inner side of the first sheet.

21. The window of claim 20, wherein the substrate comprises polycarbonate.

22. The window of claim 20, wherein the fourth layer is a coating layer.

23. The window of claim 22, wherein the coating is selected from the group consisting of silicone hard coats, acrylate hard coats, silicone hard coats with acrylate primer, polyurethane hard coats, and melamine hard coats.

24. The window of claim 20, wherein the first sheet is transparent.

25. The window of claim 1, wherein the polycarbonate of the first layer further comprises repeat units derived from a monomer different than the monomer of structure I.

26. The window of claim 25, wherein the polycarbonate of the first layer further comprises repeat units derived from a monomer of structure:

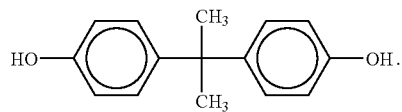

27. The window of claim 25, wherein the polycarbonate of the first layer comprises at least 25% by weight of repeat units derived from structure I.

28. The window of claim 27, wherein the polycarbonate of the first layer comprises at least 50% by weight of repeat units derived from structure I.

29. The window of claim 28, wherein the polycarbonate of the first layer comprises at least 75% by weight of repeat units derived from structure I.

30. The window of claim 1, wherein the window is a multi-pane window comprising a second sheet supported by the frame.

31. The window of claim 30, wherein the first, second, or both first and second sheets are transparent.

32. The window of claim 30, wherein the second sheet comprises a first layer of polycarbonate comprising repeat units derived from a monomer of structure I:

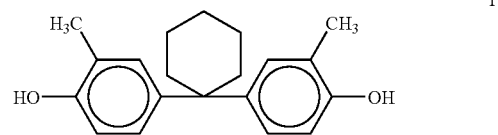

I wherein the first and second sheets have inner and outer sides wherein the inner side of the first sheet faces the inner side of the second sheet.

33. The window of claim 32, wherein the first, second, or both first and second sheets further comprise a coplanar substrate wherein the substrate is on the inner side of its respective sheet and the first layer of the first and second sheets is on the outer side of its respective sheet.

34. The window of claim 33, wherein the first, second, or both first and second sheets are transparent.

35. The window of claim 33, wherein the substrate of the first, second, or both first and second sheets comprise polycarbonate.

36. The window of claim 33, wherein the first, second, or both first and second sheets further comprise a second layer, wherein the second layer is disposed over the first layer on the outer side of the respective sheet.

37. The window of claim 36, wherein the second layer is a coating layer selected from the group consisting of silicone hard coats, acrylate hard coats, silicone hard coats with acrylate primers, polyurethane hard coats, and melamine hard coats.

38. The window of claim 37, wherein the coating layer is a silicone hard coat.

39. The window of claim 32, wherein the polycarbonate of the first layer of the first, second, or both sheets further comprises repeat units derived from a monomer different than the monomer of structure I.

40. The window of claim 39, wherein the polycarbonate of the first layer further comprises repeat units derived from a monomer of structure:

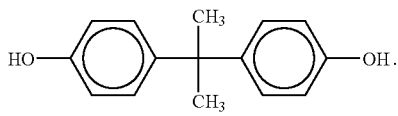

41. The window of claim 39, wherein the polycarbonate of the first layer comprises at least 25% by weight of repeat units derived from structure I.

42. The window of claim 41, wherein the polycarbonate of the first layer comprises at least 50% by weight of repeat units derived from structure I.

43. The window of claim 42, wherein the polycarbonate of the first layer comprises at least 75% by weight of repeat units derived from structure I.

44. The window of claim 1, wherein the frame is disposed in the housing of a cell phone.

45. The window of claim 1, wherein the frame is disposed in a building.

46. The window of claim 1, wherein the polycarbonate of the first layer further comprises an additive selected from the group consisting of heat stabilizers, mold release agents, and UV stabilizers, flame retardants, infrared shielding agents, whitening agents, thermal stabilizers, antioxidants, light stabilizers, plasticizers, colorants, extenders, antistatic agents, catalyst quenchers, mold releasing agents, additional resin, blowing agents, and processing aids.

47. An article comprising:
   a layered sheet comprising:
      a substrate, and
      a first coplanar layer, wherein the first layer comprises polycarbonate comprising repeat units derived from a monomer of structure I:

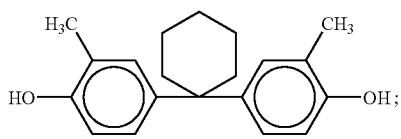

and wherein at least 20% of the surface area of the article is transparent.

48. The article of claim 47, wherein at least 40% of the surface area of the article is transparent.

49. The article of claim 47, wherein the substrate comprises polycarbonate.

50. The article of claim 47, further comprising a coplanar second layer disposed on the first layer away from the substrate.

51. The article of claim 50, wherein the second layer is a coating layer.

52. The article of claim 51, wherein the coating is selected from the group consisting of silicone hard coats, acrylate hard coats, silicone hard coats with acrylate primers, polyurethane hard coats, and melamine hard coats.

53. A method of forming a window, wherein the window comprises:
   a frame, and
   a first sheet, wherein the first sheet is supported by the frame and comprises a first layer, and wherein the first layer comprises polycarbonate comprising repeat units derived from a monomer of structure I:

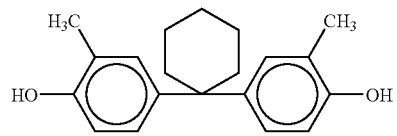

wherein the method comprises the steps of:
   (i) forming the first sheet, and
   (ii) supporting the first sheet with the frame, thereby forming a window.

54. The method of claim 53, wherein the first sheet is transparent.

55. An enclosure comprising a window, wherein the window comprises:
   a frame,
   a first sheet supported by the frame, wherein the first sheet comprises a first layer, and wherein the first layer comprises polycarbonate comprising repeat units derived from a monomer of structure I:

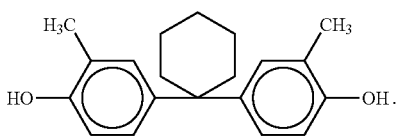

56. The enclosure of claim 55, wherein the first sheet is transparent.

57. The enclosure of claim 55, wherein the enclosure is a building on a farm.

58. The enclosure of claim 57, wherein the building is an animal stable.

59. An enclosed electrical fixture comprising;
   an electrical fixture, a base, and a cover, wherein the cover is supported by the base and the electrical fixture is enclosed between the cover and the base, wherein the cover comprises a first layer, and wherein the first layer comprises a polycarbonate comprising repeat units derived from a monomer of structure I:

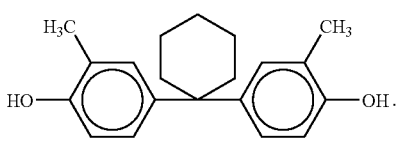

60. The enclosed electrical fixture of claim 59, wherein the electrical fixture is selected from the group consisting of a socket capable of receiving an illuminating device, a surveillance fixture capable of receiving a surveillance camera, a plug receiver capable of receiving a plug, and a switch.

61. The enclosed electrical fixture of claim 59, wherein the cover is transparent.

62. A method of improving scratch resistance and ammonia resistance of polycarbonate, comprising the step of incorporating into the polycarbonate repeat units derived from a monomer of structure I:

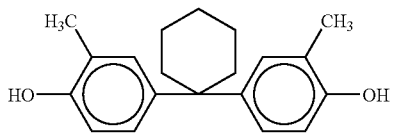

thereby improving the scratch resistance and ammonia resistance of a sheet comprising polycarbonate.

63. The method of claim 62, further comprising the step of forming a coating layer on the polycarbonate wherein the coating layer is selected from the group consisting of silicone hard coats, acrylate hard coats, silicone hard coats with acrylate primers, polyurethane hard coats, and melamine hard coats.

64. A building comprising an enclosed electrical fixture comprising:

an electrical fixture, a base, and a cover, wherein the cover is supported by the base and the electrical fixture is enclosed between the cover and the base, wherein the cover comprises a first layer, and wherein the first layer comprises a polycarbonate comprising repeat units derived from a monomer of structure I:

65. The building of claim 64, wherein the building is a building on a farm.

66. The building of claim 65, wherein the building is an animal stable.

67. The building of claim 64, wherein the cover of the enclosed electrical fixture is transparent.

* * * * *